(12) United States Patent
Fukuda

(10) Patent No.: US 12,304,208 B2
(45) Date of Patent: May 20, 2025

(54) COSMETIC HANDY INKJET PRINTER

(71) Applicant: Kao Corporation, Tokyo (JP)

(72) Inventor: Teruyuki Fukuda, Wakayama (JP)

(73) Assignee: Kao Corporation, Tokyo (JP)

( * ) Notice: Subject to any disclaimer, the term of this patent is extended or adjusted under 35 U.S.C. 154(b) by 366 days.

(21) Appl. No.: 17/904,059

(22) PCT Filed: Feb. 10, 2021

(86) PCT No.: PCT/JP2021/004961
§ 371 (c)(1),
(2) Date: Aug. 11, 2022

(87) PCT Pub. No.: WO2021/162036
PCT Pub. Date: Aug. 19, 2021

(65) Prior Publication Data
US 2023/0136205 A1 May 4, 2023

(30) Foreign Application Priority Data
Feb. 12, 2020 (JP) .................. 2020-021796

(51) Int. Cl.
*B41J 3/36* (2006.01)
*B41J 2/165* (2006.01)
(Continued)

(52) U.S. Cl.
CPC .............. *B41J 2/1652* (2013.01); *B41J 2/17* (2013.01); *B41J 2/1714* (2013.01); *B41J 2/175* (2013.01);
(Continued)

(58) Field of Classification Search
CPC .. B41J 2/1652; B41J 2/18; B41J 2002/16561; B41J 2/1714; B41J 2202/12; B41J 3/36;
(Continued)

(56) References Cited

U.S. PATENT DOCUMENTS

| | | | |
|---|---|---|---|
| 6,609,791 B1 * | 8/2003 | Miyamoto | B41J 11/005 347/104 |
| 2008/0018707 A1 | 1/2008 | Masuyama et al. | |

(Continued)

FOREIGN PATENT DOCUMENTS

| | | |
|---|---|---|
| CN | 205467967 U | 8/2016 |
| CN | 107031199 A | 8/2017 |

(Continued)

OTHER PUBLICATIONS

W. Steiling et al., "Principles for the safety evaluation of cosmetic powders", Toxicology Letters 297, 2018, pp. 8-18.

(Continued)

*Primary Examiner* — Yaovi M Ameh
(74) *Attorney, Agent, or Firm* — Oblon, McClelland, Maier & Neustadt, L.L.P.

(57) ABSTRACT

A cosmetic handy ink-jet printer including an ink-jet head for ejecting an ink containing an inorganic pigment, an ink circulation device for circulating the ink, and a body deelectrification device for removing static electricity from a body of the printer. The ink circulation device includes an ink receptacle in which the ink is accommodated, and an ink circulation path through which the ink is circulated. The body deelectrification device is a capacitor or a grounded circuit.

19 Claims, 15 Drawing Sheets

(51) Int. Cl.
   *B41J 2/17*     (2006.01)
   *B41J 2/175*    (2006.01)
   *B41J 2/18*     (2006.01)
   *B41J 3/407*    (2006.01)
   *A45D 34/00*    (2006.01)
   *C09D 11/322*   (2014.01)
   *H05F 3/02*     (2006.01)

(52) U.S. Cl.
   CPC ............... *B41J 2/18* (2013.01); *B41J 3/36* (2013.01); *B41J 3/407* (2013.01); *A45D 34/00* (2013.01); *A45D 2034/005* (2013.01); *B41J 2002/16561* (2013.01); *B41J 2202/12* (2013.01); *C09D 11/322* (2013.01); *H05F 3/02* (2013.01)

(58) Field of Classification Search
   CPC .... B41J 3/407; B41J 2/17; B41J 2/175; H05F 3/02; A45D 34/00; A45D 2034/005; C09D 11/322
   See application file for complete search history.

(56) References Cited

U.S. PATENT DOCUMENTS

| | | | |
|---|---|---|---|
| 2015/0375532 A1 | 12/2015 | Tokai et al. | |
| 2017/0135921 A1* | 5/2017 | Edaka | A61K 8/39 |
| 2017/0190182 A1 | 7/2017 | Suzuki | |
| 2018/0304639 A1 | 10/2018 | Otowa et al. | |
| 2018/0360711 A1 | 12/2018 | Edaka et al. | |
| 2019/0231661 A1 | 8/2019 | Lingoes et al. | |
| 2019/0231662 A1 | 8/2019 | Lingoes et al. | |
| 2019/0231669 A1 | 8/2019 | Deshayes et al. | |
| 2019/0299666 A1 | 10/2019 | Miyakawa | |
| 2020/0171831 A1 | 6/2020 | Lee et al. | |
| 2020/0188250 A1 | 6/2020 | Lingoes et al. | |
| 2021/0030637 A1 | 2/2021 | Lingoes et al. | |
| 2021/0330562 A1 | 10/2021 | Lingoes et al. | |

FOREIGN PATENT DOCUMENTS

| | | | | |
|---|---|---|---|---|
| CN | 109803635 A | | 5/2019 | |
| JP | 8-187842 A | | 7/1996 | |
| JP | 3066032 U | | 2/2000 | |
| JP | 3098395 U | * | 2/2004 | ............ A45D 34/04 |
| JP | 2004106339 A | * | 4/2004 | ............... B41J 3/28 |
| JP | 2006-175743 A | | 7/2006 | |
| JP | 2006218801 A | * | 8/2006 | ............... B41J 2/01 |
| JP | 2009-95119 A | | 4/2009 | |
| JP | 2009095119 A | * | 4/2009 | ............... H02J 7/02 |
| JP | 2011-178089 A | | 9/2011 | |
| JP | 2012-11693 A | | 1/2012 | |
| JP | 2015-131406 A | | 7/2015 | |
| JP | 2015-139978 A | | 8/2015 | |
| JP | 2016-10865 A | | 1/2016 | |
| JP | 2016010865 A | * | 1/2016 | ............... B41J 2/01 |
| JP | 2016150495 A | * | 8/2016 | ............... B41J 2/18 |
| JP | 2017-65215 A | | 4/2017 | |
| JP | 2017-74691 | | 4/2017 | |
| JP | 2018-1729 A | | 1/2018 | |
| JP | 2018-533563 A | | 11/2018 | |
| JP | 2019-172417 A | | 10/2019 | |
| KR | 10-1245720 | | 4/2013 | |
| WO | WO 2019/050087 A1 | | 3/2019 | |

OTHER PUBLICATIONS

International Search Report Issued May 11, 2021, in PCT/JP2021/004961, filed on Feb. 10, 2021, 3 pages.
Extended European Search Report issued Jan. 31, 2024 in European Patent Application No. 21753215.9, 8 pages.

* cited by examiner

COSMETIC HANDY INKJET PRINTER

CROSS-REFERENCE TO RELATED APPLICATIONS

The present application is a 35 U.S.C. § 371 national stage application of International patent application PCT/JP2021/004961, filed Feb. 10, 2021, which is based on and claims the benefit of priority to Japanese Application No. 2020-021796, filed Feb. 12, 2020. The entire contents of these applications are incorporated herein by reference.

FIELD OF THE INVENTION

The present invention relates to a cosmetic handy ink-jet printer.

BACKGROUND OF THE INVENTION

Makeup has hitherto been applied using a variety of devices. For example, a brush, a powder puff, and further a spray gun, etc., have been used in order to apply a convenient and high-quality makeup. In recent years, various studies have been made in order to use ink-jet printing techniques in cosmetic application fields.

The ink-jet printing techniques are printing methods in which high-quality images can be produced on a substrate to be printed while being kept in non-contact with the substrate, and have been therefore utilized in extensive application fields including not only domestic printing applications and commercial printing applications, but also industrial printing applications. With the widespread of the application fields of the ink-jet printing techniques, studies on ink-jet printers having various functions have been made in order to meet requirements for inks having various functions.

For example, JP 2016-150495A (Patent Literature 1) aims at providing an inkjet printing apparatus that is useful upon producing a high-definition printed material using an ink having a comparatively unstable dispersion state, and discloses an ink-jet printing unit that includes an ink-jet head, an ink reservoir, an ink circulation section, a control section and a connector for connecting the unit to an external device, in which the connector is equipped with an inert gas line, a power supply line and a communication line, and an ink-jet printing apparatus to which the ink-jet printing unit can be mounted.

JP 2012-11693A (Patent Literature 2) aims at providing an ink-jet apparatus that is equipped with a mist recovery mechanism that is capable of not only trapping ink mist or other foreign matters which are floated in the air, with a high efficiency, but also achieving a long-term maintenance-free condition of the apparatus, and discloses an ink-jet apparatus that includes a liquid container for accommodating a liquid, a duct for discharging a gas in a first space in which an ink-jet head is placed, into the liquid accommodated in the liquid container, and a pump for discharging the gas from a second space present above a level surface of the liquid inside of the liquid container, in which when the pump is operated, the pressure of the second space becomes lower than that of the first space, so that the gas in the first space is discharged in the liquid through the duct, and ascended therein in the form of bubbles.

JP 2018-1729A (Patent Literature 3) aims at providing an ink-jet apparatus that is equipped with a recovery mechanism for recovering fine ink mist generated from an ink-jet head, and discloses an ink-jet apparatus that is equipped with the head from which an ink is ejected, and the recovery mechanism for recovering the ink mist generated in association with an ink ejecting action of the head, in which the recovery mechanism includes an inlet port from which a gas containing the ink mist is introduced, a discharge port from which the gas is discharged, a flow path through which the gas introduced from the inlet port and discharged from the discharge port is flowed, and a mist supply means for supplying mist particles for combining the ink mist therewith, to the flow path.

SUMMARY OF THE INVENTION

The present invention relates to a cosmetic handy ink-jet printer including an ink-jet head for ejecting an ink containing an inorganic pigment, an ink circulation device for circulating the ink, and a body deelectrification device for removing static electricity from a body of the printer, in which:
the ink circulation device includes an ink receptacle in which the ink is accommodated, and an ink circulation path through which the ink is circulated; and
the body deelectrification device is a capacitor or a grounded circuit.

DETAILED DESCRIPTION OF THE INVENTION

Figure 1:
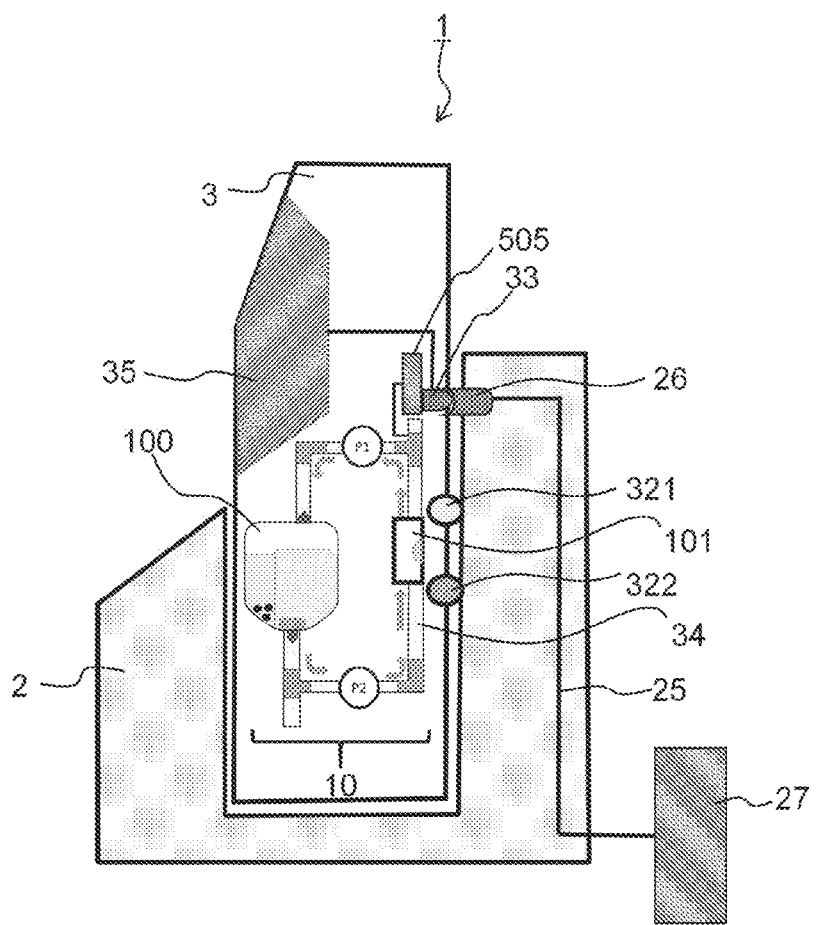
FIG. 1 is a view showing a hand-held unit vertically mounted to a dock unit in a cosmetic handy ink-jet printer according to a first embodiment of the present invention.

In ink-jet printers used in ink-jet techniques, the relative position between a ink-jet head and a substrate to be printed has been designed under strictly controlled conditions to obtain high-quality images. However, with respect to handy-type ink-jet printers that can be used in a hand-held state, it tends to be difficult to strictly control the relative position between the ink-jet head and the substrate to be printed. Thus, there is such a present status that only a very small number of practically usable handy-type ink-jet printers have been hitherto proposed even with respect to those used for printing on a plain flat paper, and the techniques concerning the handy-type ink-jet printers have been less maturated.

In addition, in the case where the ink-jet printers are applied to makeup applications, properties of cosmetics used therein have first posed problems. In general, the cosmetics, such as a liquid foundation, etc., have been designed such that the viscosity of the cosmetics lies within the range of from 1,000 to 100,000 mPa·s. The liquid foundation contains an inorganic pigment, such as titanium oxide, zinc oxide, iron oxide, etc., as a colorant. These inorganic pigments generally have a specific gravity of from 2 to 5×10³ kg/m³, whereas the specific gravity of water or an alcohol as a medium of the cosmetics is not more than 1×10³ kg/m³. Therefore, according to the Stokes' equation representing a terminal velocity of fine particles upon being precipitated in a fluid, the inorganic pigments are prevented from being precipitated for a short period of time by increasing a viscosity of the medium The Stokes' equation is represented by the following formula.

$$V_s = D_p^2 (\rho_p - \rho_f) g / 18\eta$$

wherein $V_s$: terminal velocity [m/s]; $D_p$: particle diameter [m]; $\rho_p$: density of particles [kg/m³]; $\rho_f$: density of medium [kg/m³]; g: acceleration of gravity [m/s²]; η: viscosity of medium [Pa·s].

On the other hand, the ink used for the ink-jet purpose has been designed such that the viscosity of the ink is as low as about 30 mPa·s. This is because by controlling the viscosity of the ink used in the ink-jet printer to such a low level, it is intended to reduce a flow resistance of the ink when flowed through a very small conduit in an ink-jet head and rapidly refill the ink-jet head with the ink in association with ejection of the ink.

As suggested from the above, in the case where the low-viscosity ink adapted for the ink-jet printer contains the inorganic pigment having a high density, the inorganic pigment tends to be precipitated in the ink, so that clogging of a flow path in the ink-jet head tends to occur.

In the Patent Literature 1, as the measures taken for preventing clogging of the flow path in the ink-jet head, there has been proposed the ink-jet printer that is equipped with the ink circulation section. However, the medium is flowed through a large portion of the ink circulation path which is disposed in the horizontal direction that is not the direction resistant against gravity. Therefore, in the case where the ink flow is a horizontal laminar flow, precipitation of the inorganic pigment is not inhibited by the ink flow. On the other hand, in order to increase a velocity of the ink flow to such an extent that the inorganic pigment can be prevented from being precipitated owing to a horizontal turbulence flow of the ink, it is required not only to increase a size of the circulation device, but also to wait until stabilization of the ink flow to stably eject the ink. Thus, it tends to be difficult to mount such a large circulation device to the handy ink-jet printer.

In addition, when ejecting the ink containing the inorganic pigment by an ink-jet method, fine ink mist may be by-produced. For this reason, if the ink is used under the condition having such a fear that the inorganic pigment in the ink mist is aspirated by humans, it is required to employ the apparatus whose construction is designed so as to avoid aspiration of the ink mist by humans.

In the Patent Literature 2, with respect to the ink-jet printer in which the ink mist generated is reduced, there has been proposed the method of collecting the ink mist generated therein in an air flow and trapping the thus collected ink mist with a porous member or a mesh member. However, in order to produce the air flow enough to recover the ink mist, it is required to ensure a large space for installing an air feed portion and a mist recovery portion in the apparatus. Therefore, it has been difficult to mount these portions or members to the handy-type ink-jet printer.

Furthermore, in the Patent Literature 3, with respect to the ink-jet printer in which the ink mist generated is reduced, there has been proposed the method in which mist-like particles having a larger particle size than that of the ink mist are introduced into a region where the ink mist is generated, and the ink mist is recovered together with the mist-like particles by a gas flow. However, in the case where such a method is applied to the ink mist whose motion is random without directionality around the ink-jet head, there tends to occur such a problem that the mist-like particles are adhered to nozzles of the head so that the condition of ejection of the ink therefrom tends to be deteriorated.

The present invention relates to a cosmetic handy ink-jet printer that is excellent in ejection properties of an ink and capable of reducing ink mist by-produced in association with the action of ejection of the ink even when the ink used therein contains an inorganic pigment as a colorant.

The present inventor has found that by using a handy ink-jet printer that is equipped with an ink circulation device for circulating an ink containing an inorganic pigment and a body deelectrification device for removing static electricity from a body of the printer, it is possible to achieve excellent ejection properties of the ink and reduce ink mist by-produced in association with the action of ejection of the ink even when the ink used therein contains an inorganic pigment as a colorant.

That is, the present invention relates to the following aspects [1] and [2]. [1] A cosmetic handy ink-jet printer including an ink-jet head for ejecting an ink containing an inorganic pigment, an ink circulation device for circulating the ink, and a body deelectrification device for removing static electricity from a body of the printer, in which:

the ink circulation device includes an ink receptacle in which the ink is accommodated, and an ink circulation path through which the ink is circulated; and the body deelectrification device is a capacitor or a grounded circuit. [2] A method of conducting makeup printing, including the step of ejecting the ink containing the inorganic pigment from the ink-jet head to a substrate to be printed which is a skin, a hair or a nail, using the cosmetic handy ink-jet printer according to the above aspect [1].

Incidentally, the term "handy" as used in the present invention means that an object has a shape and a size which are adapted such that the user can use the object by holding it in hand, and is also referred to as "hand-held" in English language. In the present specification, the term "handy" is used principally to represent the above meaning.

In accordance with the present invention, it is possible to provide a cosmetic handy ink-jet printer that is excellent in ejection properties of an ink and capable of reducing ink mist by-produced in association with the action of ejection of the ink even when the ink used therein contains an inorganic pigment as a colorant.

In the following, the present invention will be described in detail by referring to various embodiments.

First Embodiment

<Construction of Cosmetic Handy Ink-Jet Printer>

The cosmetic handy ink-jet printer 1 according to a first embodiment of the present invention includes an ink-jet head for ejecting an ink containing an inorganic pigment, an ink circulation device for circulating the ink, and a body deelectrification device for removing static electricity from a body of the printer.

The ink circulation device includes an ink receptacle in which the ink is accommodated, and an ink circulation path through which the ink is circulated.

The body deelectrification device is a capacitor or a grounded circuit.

The cosmetic handy ink-jet printer 1 according to the first embodiment of the present invention is preferably constructed of a dock unit 2 and a hand-held unit 3 that can be detached from the dock unit 2 to conduct makeup printing, from the viewpoint of downsizing the printer and facilitating the makeup printing.

Referring to FIG. 1, there is shown the cosmetic handy ink-jet printer 1 that is equipped with the dock unit 2 and the hand-held unit 3 vertically mounted in the dock unit 2.

The hand-held unit 3 is connected to a dock-side conductive terminal 26 through a hand-held-side conductive terminal 33, and further connected to an earth 27 through a grounded circuit 25. In FIG. 1, only typical conductive lines are shown, but the other conductive lines are omitted.

The hand-held unit 3 is equipped with an ink circulation device including an ink-jet head 101, an ink receptacle 100 and an ink circulation path 34. The ink circulation path 34 may be disposed such that the ink is circulated in the direction that is resistant against gravity in the ink-jet head 101.

In the cosmetic handy ink-jet printer 1 according to the first embodiment of the present invention, as the body deelectrification device, there may be adopted a construction in which the hand-held unit is equipped with a capacitor 505, or a construction in which the dock unit is equipped with the grounded circuit 25.

In addition, in the case where the hand-held unit includes a grip portion 35 formed of a conductive material, electrostatic charges on the user may be connected to earth by holding the grip portion 35 in his hand upon use, so that the apparatus is prevented from suffering from undesirable electrification. Moreover, by holding the hand-held unit 3 in hand, the circulation action of the ink is stopped, so that the printer is ready for conducting the makeup printing.

In addition, in the case where the hand-held unit 3 includes a pair of rollers 321 and 322, when using the ink-jet printer in makeup applications, it is possible to conduct good makeup printing to a non-planar substrate, such as a skin, a hair, a nail, etc.

Figure 2:
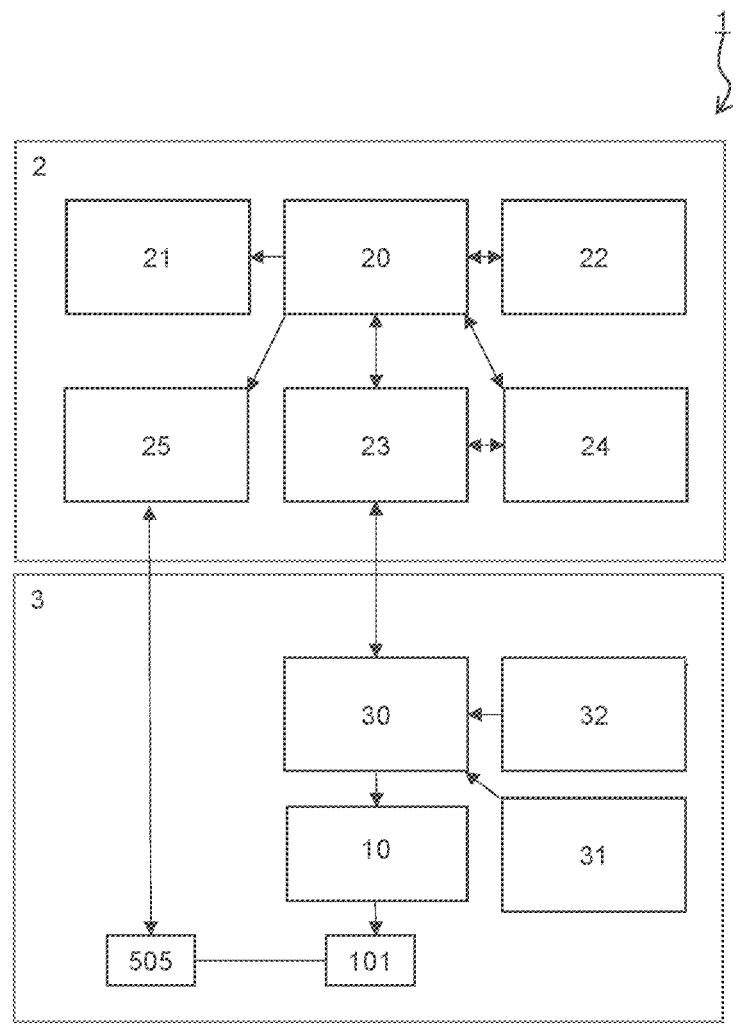
FIG. 2 is a block diagram showing a construction of the cosmetic handy ink-jet printer according to the first embodiment of the present invention.

FIG. 2 is a block diagram showing respective components of the dock unit 2 and the hand-held unit 3. The upper block shows the components of the dock unit 2, whereas the lower block shows the components of the hand-held unit 3.

On a control board of the dock unit 2, there is disposed CPU 20 which is connected to a charging device 21 for power supply, and a maintenance device 22 for inputting and indicating necessary information upon conducting the makeup printing. The CPU 20 serves for receiving image data from an information processing and inputting device, such as a smartphone, etc., and an image capturing device, such as a camera, in a transmitting and receiving section 23, preparing dot pattern data in an image processing circuit 24 for performing input, return, and transfer of images, etc., and transferring the thus prepared data into the ink-jet head 101 through a head control section 30 of the hand-held unit 3. At this time, processing of the images, sorting of the data, etc., which are required to eject the ink from the ink-jet head 101, can be completed by an application software stored in the smartphone. The CPU 20 built in the dock unit 2 serves for transferring the dot pattern data received from the smartphone to the head control section 30 in the hand-held unit 3. As a preferred example of the aforementioned preparation and transfer of the dot pattern data by the smartphone, etc., there may be mentioned the method in which the image data is converted into a bit map data, and then the bit map data is transferred to the apparatus.

When the dot pattern data corresponding to one line of images to be printed by a print head is received by the head control section 30, the thus received dot pattern data is synchronized with data indicating a moving distance of the hand-held unit 3, and an ejection signal is transmitted to the ink-jet head 101 at a predetermined time. A drive section of the ink-jet head includes a drive waveform generation circuit for reading a drive waveform or a voltage value which are preliminarily recorded in ROM disposed in the vicinity of the ink-jet head 101.

As a circuit for detecting a moving distance of the ink-jet head 101 upon the printing, there are used a roller encoder 32 and an optical position sensor 31. The roller encoder 32 is a device that is installed in the pair of rollers 321 and 322 which come into contact with a treatment portion to which makeup printing is to be conducted using the ink, and apply a tension force to the treatment portion so as to form the treatment portion into a pseudo flat shape, and serves for measuring a moving distance of the hand-held unit 3 from a rotating amount of the respective rollers that are rotated in association with movement of the hand-held unit while contacting with the treatment portion. In addition, the optical position sensor 31 is based on the technology used in an optical mouse for personal computers, etc., and is capable of irradiating light to an object to recognize a surface shape of the object and detect a moving amount of the surface shape, whereby it is possible to detect a moving amount of the hand-held unit 3.

On the basis of a drive command fed to the ink-jet head 101 and the moving distance of the ink-jet head 101 which is read by the optical position sensor 31, an actuator of the ink-jet head 101 is driven to eject the ink to a predetermined position and form images thereon.

<Ink Containing Inorganic Pigment>
(Inorganic Pigment)

The ink of the present invention contains an inorganic pigment as a colorant. Examples of the inorganic pigment include carbon blacks, metal oxides, and the like. As the inorganic pigment, there may be used either a white-based inorganic pigment or a non-white-based inorganic pigment other than the white-based pigment.

Examples of the white-based inorganic pigment include titanium oxide; zinc oxide, and the like.

Examples of the non-white-based inorganic pigment include yellow oxide, red iron oxide, black iron oxide, carbon blacks, ultramarine blue, Prussian blue, blue titanium oxide, black titanium oxide, chromium oxide, chromium hydroxide, a titanium/titanium oxide sintered product, and the like.

The density of the aforementioned inorganic pigment is preferably not less than 1 $g/cm^3$, more preferably not less than 2 $g/cm^3$ and even more preferably not less than 3 $g/cm^3$, and is also preferably not more than 6 $g/cm^3$.

The ink of the present invention may also contain the other colorant in addition to the inorganic pigment from the viewpoint of improving concealability thereof as well as from the viewpoint of conducting makeup printing on a surface of a body (skin).

Examples of the other colorant include an organic pigment, a hydrophobic dye, a water-soluble dye (such as an acid dye, a reactive dye, a direct dye, etc.), and the like. Incidentally, the hydrophobic dye used herein means a dye preferably having a solubility in water of less than 6% by mass as measured by dissolving the dye in 100 g of water (at 20° C.). Examples of the hydrophobic dye include oil-soluble dyes, disperse dyes and the like.

Specific examples of the other colorant include organic pigments, such as Red No. 201, Red No. 202, Yellow No. 401, Blue No. 404, etc.; lake pigments, such as Red No. 104, Red. No. 230, Yellow No. 4, Yellow No. 5, Blue No. 1, etc.; dyes, such as Red No. 226, Acid Yellow 1, Acid Orange 7, Food Blue 2, Acid Red 52, etc.; pigments or dyes coated with a resin, such as a polymethacrylic acid ester, etc.; and the like.

The aforementioned colorant may be subjected to surface treatments from the viewpoint of improving dispersibility of the colorant in the ink. As the surface treatments, there may be mentioned hydrophobization treatments in which ordinary cosmetic particles are treated with various kinds of hydrophobizing agents. Examples of the hydrophobization treatments include silicone treatments, fatty acid treatments, lauroyl lysine treatments, surfactant treatments, metal soap treatments, fluorine compound treatments, lecithin treatments, nylon treatments, and polymer treatments.

In the case where titanium oxide, zinc oxide, etc., are used as the aforementioned inorganic pigment, from the viewpoint of improving dispersibility of the inorganic pigment in the ink as well as from the viewpoint of improving sweat resistance of the makeup applied, the surface of the inorganic pigment, such as titanium oxide, zinc oxide, etc., is preferably subjected to the hydrophobization treatments.

As the aforementioned colorant, from the viewpoint of improving concealability thereof as well as from the viewpoint of conducting makeup printing on a skin, there are preferably used colorants that are capable of coloring the skin of the user to a color range in the vicinity of the complementary color for compensating a skin color of the user, for example, a yellow color, a blue to green color, a violet color, a brown color, etc.

In addition, from the viewpoint of enhancing a sense of unity with the skin in appearance, there are preferably used those colorants that are capable of coloring the skin of the user to a color close to an original skin color of the user. In particular, from the viewpoint of effectively concealing the skin color unevenness (for example, such as facial redness, freckles, bags under eyes, spots, etc.) when applying the makeup printing to the skin, it is preferable to use colorants that are capable of coloring the skin of the user to an original skin color of the user.

The aforementioned colorants may be used alone or in combination of any two or more thereof according to the color of the makeup printing as aimed. From the viewpoint of enhancing a sense of unity with the skin in appearance, as the aforementioned inorganic pigment, there are preferably used two or more colorants that are different in color from each other. For example, a red colorant, a yellow colorant and a black colorant have been generally used in combination with each other to adjust the skin color. However, a blue colorant or a white colorant may be further used in combination with these colorants.

The aforementioned colorant is preferably used in the form of colorant particles prepared by dispersing the colorant with a polymer with which the colorant can be dispersed in a medium (hereinafter also referred to as a "dispersive polymer"), and more preferably used in the form of polymer particles containing the colorant (hereinafter also referred to as "colorant-containing polymer particles"), from the viewpoint of achieving uniform coloration as well as from the viewpoint of improving water resistance of makeup applied by the makeup printing. The colorant-containing polymer particles may have any configuration as long as the particles are formed of the colorant and the dispersive polymer. Examples of the configuration of the colorant-containing polymer particles include the particle configuration in which the colorant is coated with the dispersive polymer, the particle configuration in which the colorant is enclosed in the dispersive polymer, the particle configuration in which the colorant is uniformly dispersed in the dispersive polymer, and the particle configuration in which the colorant is exposed onto the surface of the respective polymer particles, etc., as well as a mixture of these particle configurations.

(Dispersive Polymer)

The dispersive polymer, preferably the dispersive polymer constituting the colorant-containing polymer particles, is preferably an ionic group-containing polymer from the viewpoint of improving dispersibility of the colorant. As the ionic group-containing polymer, there may be used an anionic group-containing anionic polymer and a cationic group-containing cationic polymer.

[Anionic Polymer]

The anionic polymer preferably includes those polymers containing an acid group that include groups that are capable of releasing hydrogen ions upon dissociation thereof to allow the polymer to exhibit acidity, such as a carboxy group (—COOM), a sulfonic acid group (—$SO_3M$), a phosphoric acid group (—$OPO_3M_2$), etc., or dissociated ion forms of these groups (such as —$COO$, —$SO_3$, —$OPO_3^2$ and —OPO$_3$M), and the like. In the aforementioned chemical formulae, M is a hydrogen atom, an alkali metal, ammonium or an organic ammonium.

Specific examples of the basic skeleton of the anionic polymer include an acrylic polymer, a polyester, a polyurethane, and the like. Of these polymers, preferred is the acrylic polymer.

More specifically, the anionic polymer is preferably an anionic acrylic polymer containing a constitutional unit derived from an acid group-containing monomer.

As the acid group-containing monomer, preferred is a carboxy group-containing monomer, more preferred is at least one monomer selected from the group consisting of (meth)acrylic acid, crotonic acid, itaconic acid, maleic acid, fumaric acid, citraconic acid and 2-methacryloyloxymethylsuccinic acid, and even more preferred is (meth)acrylic acid.

The term "(meth)acrylic acid" as used herein means at least one compound selected from the group consisting of acrylic acid and methacrylic acid.

The anionic polymer is preferably a polymer containing the constitutional unit derived from the acid group-containing monomer and a constitutional unit derived from a (meth)acrylic acid alkyl ester; more preferably a polymer containing the constitutional unit derived from the acid group-containing monomer, the constitutional unit derived from the (meth)acrylic acid alkyl ester and a constitutional unit derived from an (N-alkyl)(meth)acrylamide; even more preferably a (meth)acrylic acid/(meth)acrylic acid alkyl ester/(N-alkyl)(meth)acrylamide copolymer; and further even more preferably an acrylic acid/acrylic acid alkyl ester/(N alkyl) acrylamide copolymer.

Examples of commercially available products of the anionic acrylic polymer include ((meth)acrylic acid/(meth)acrylic acid alkyl ester/(N-alkyl)alkyl acrylamide) copolymer AMP, such as "PLUS SIZE L-9909B" available from GOO Chemical Co., Ltd., and the like. Examples of commercially available products of the other polymers containing a constitutional unit derived from acrylic acid or methacrylic acid as the acid group-containing monomer which can be used in the cosmetic applications include "Aniset KB-100H" and "Aniset NF-1000" both available from Osaka Organic Chemical Industry Ltd.; "Ultrahold 8", "Ultrahold Strong" and "Ultrahold Power" all available from BASF; "PLUS SIZE L-9900", "PLUS SIZE L-9540B", "PLUS SIZE L-9600U", "PLUS SIZE L-9715", "PLUS SIZE L-53", "PLUS SIZE L-6330", "PLUS SIZE L-6466", "PLUS SIZE L-6740B", "PLUS SIZE L-53D A for Color" and "PLUS SIZE L-75CB" all available from GOO Chemical Co., Ltd.; and the like.

[Cationic Polymer]

The cationic polymer is preferably a polymer containing a cationic group, such as a protonic acid salt of a primary, secondary or tertiary amino group, and a quaternary ammonium group, etc.

As the cationic polymer, there may be mentioned a natural cationic polymer and a synthetic cationic polymer.

Examples of the natural cationic polymer include a polymer obtained from a natural substance by subjecting the substance to treatments such as extraction, refining, etc., and a modified polymer obtained by chemically modifying the polymer, e.g., a polymer containing a glucose residue in a skeleton of the polymer. Specific examples of the natural cationic polymer include cationated guar gum; cationated tara gum; cationated locust bean gum; cationated cellulose; cationated hydroxyalkyl cellulose; cationated starch; and the like.

Examples of the synthetic cationic polymer include polyethyleneimine, polyallylamine or an acid-neutralized product thereof, a polyglycol-polyamine condensation product, cationic polyvinyl alcohol, cationic polyvinyl pyrrolidone, a cationic silicone polymer, a 2-(dimethylamino)ethyl methacrylate polymer or an acid-neutralized product thereof, poly(trimethyl-2-methacryloyloxyethyl ammonium chloride), an amine/epichlorohydrin copolymer, an N,N-dimethylaminoethyl methacrylate diethyl sulfuric acid salt/vinyl pyrrolidone copolymer, an N,N-dimethylaminoethyl methacrylate diethyl sulfuric acid salt/N,N-dimethyl acrylamide/dimethacrylic acid polyethylene glycol copolymer, poly(diallyl dimethyl ammonium chloride), a diallyl dimethyl ammonium chloride/acrylamide copolymer, a diallyl dimethyl ammonium chloride/sulfur dioxide copolymer, a diallyl dimethyl ammonium chloride/hydroxyethyl cellulose copolymer, a 1-allyl-3-methyl imidazolium chloride/vinyl pyrrolidone copolymer, an alkylamino (meth)acrylate/vinyl pyrrolidone copolymer, an alkylamino (meth)acrylate/vinyl pyrrolidone/vinyl caprolactam copolymer, a (3-(meth)acrylamide propyl)trimethyl ammonium chloride/vinyl pyrrolidone copolymer, an alkylaminoalkyl acrylamide/alkyl acrylamide/(meth)acrylate/polyethylene glycol (meth)acrylate copolymer, and the like. These synthetic cationic polymers may be used alone or in combination of any two or more thereof.

As commercially available products of the cationic polymer, preferred are those cationic polymers that can be used in the cosmetic applications.

Examples of the commercially available products of the cationic polymer include "H.C. Polymer 3M" and "H.C. Polymer 5" both available from Osaka Organic Chemical Industry Ltd.; "PLUS SIZE L-514" available from GOO Chemical Co., Ltd.; and the like. Among these cationic polymers, from the viewpoint of improving a sense of unity with the skin in appearance, a gloss feel and a transparent feel, preferred is a cationic silicone polymer.

The cationic silicone polymer is preferably a poly(N-acylalkyleneimine)/organopolysiloxane copolymer containing an organopolysiloxane segment (x), and a poly(N-acylalkyleneimine) segment (y) that is constituted of an alkylene group containing a cationic nitrogen atom bonded to at least one of silicon atoms contained in the segment (x) and an N-acylalkyleneimine repeating unit represented by the following general formula (1-1).

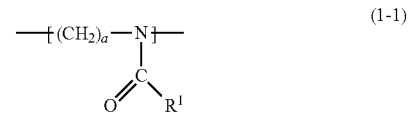

wherein $R^1$ is a hydrogen atom, an alkyl group having not less than 1 and not more than 22 carbon atoms, an aryl group having not less than 6 and not more than 22 carbon atoms, or an arylalkyl or alkylaryl group having not less than 7 and not more than 22 carbon atoms; and a is a number of 2 or 3.

In the formula (1-1), $R^1$ is preferably an alkyl group having not less than 1 and not more than 3 carbon atoms and more preferably an ethyl group, and a is preferably 2.

As the organopolysiloxane forming the segment (x), there may be mentioned, for example, a compound represented by the following general formula (1-2);

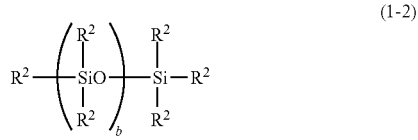
(1-2)

wherein $R^2$ is an alkyl group having not less than 1 and not more than 22 carbon atoms, a phenyl group or an alkyl group containing a nitrogen atom, and a plurality of $R^2$ groups may be the same or different from each other, with the proviso that at least one of the $R^2$ groups is an alkyl group containing a cationic nitrogen atom; and b is a number of not less than 100 and not more than 5,000.

The poly(N-acylalkyleneimine)/organopolysiloxane copolymer is preferably a copolymer that is formed by bonding the segment (y) to at least one of the silicon atoms present at a terminal end or side chain of the segment (x) through the alkylene group containing the cationic nitrogen atom.

The mass ratio of the content of the segment (x) to the total content of the segment (x) and the segment (y) [content of segment (x)/total content of segment (x) and segment (y)] in the poly(N-acylalkyleneimine)/organopolysiloxane copolymer is preferably not less than 0.1, more preferably not less than 0.3 and even more preferably not less than 0.4, and is also preferably not more than 0.99, more preferably not more than 0.95, even more preferably not more than 0.9, further even more preferably not more than 0.8 and still further even more preferably not more than 0.7.

In the present specification, the mass ratio [content of segment (x)/total content of segment (x) and segment (y)] means a ratio of a mass (Mx) of the segment (x) to a total amount of the mass (Mx) of the segment (x) and a mass (My) of the segment (y) in the poly(N-acylalkyleneimine)/organopolysiloxane copolymer.

The mass ratio [content of segment (x)/total content of segment (x) and segment (y)] may be calculated from an integration ratio between the alkyl group or the phenyl group in the segment (x) and the methylene group in the segment (y) which may be determined by a nuclear magnetic resonance ($^1$H-NMR) analysis in which the poly(N-acylalkyleneimine)/organopolysiloxane copolymer is dissolved in deuterated chloroform to prepare a 5% by mass solution thereof, and the thus obtained solution is subjected to the NMR analysis.

The weight-average molecular weight of the poly(N-acylalkyleneimine)/organopolysiloxane copolymer is preferably not less than 10,000, more preferably not less than 50,000 and even more preferably not less than 70,000, and is also preferably not more than 1,000,000, more preferably not more than 500,000 and even more preferably not more than 200,000. The weight-average molecular weight of the poly(N-acylalkyleneimine)/organopolysiloxane copolymer may be calculated from the weight-average molecular weight of the organopolysiloxane forming the segment (x) and the aforementioned mass ratio [content of segment (x)/total content of segment (x) and segment (y)].

Examples of the suitable poly(N-acylalkyleneimine)/organopolysiloxane copolymer include a poly(N-formylethyleneimine)/organopolysiloxane copolymer, a poly(N-acetylethyleneimine)/organopolysiloxane copolymer, a poly(N-propionylethyleneimine)/organopolysiloxane copolymer, and the like.

The poly(N-acylalkyleneimine)/organopolysiloxane copolymer may be produced, for example, by the method in which the poly(N-acylalkyleneimine) as a ring-opening polymerization product of a cyclic iminoether is reacted with the organopolysiloxane forming the segment (x). More specifically, the poly(N-acylalkyleneimine)/organopolysiloxane copolymer may be produced, for example, by the method described in JP 2011-126978A. The poly(N-acylalkyleneimine)/organopolysiloxane copolymer as the cationic silicone polymer may be used alone or in combination of any two or more kinds thereof.

Incidentally, the weight-average molecular weight of the dispersive polymer other than the aforementioned cationic silicone polymer may be measured by gel permeation chromatography [GPC apparatus: "HLC-8320GPC" available from Tosoh Corporation; columns: "TSKgel Super AWM-H", "TSKgel Super AW3000" and "TSKgel guardcolumn Super AW-H" all available from Tosoh Corporation; flow rate: 0.5 mL/min] using a solution prepared by dissolving phosphoric acid and lithium bromide in N,N-dimethylformamide such that concentrations of phosphoric acid and lithium bromide in the resulting solution are 60 mmol/L and 50 mmol/L, respectively, as an eluent, and using kits of monodisperse polystyrenes having previously known molecular weights [PStQuick B (F-550, F-80, F-10, F-1, A-1000), PStQuick C (F-288, F-40, F-4, A-5000, A-500] all available from Tosoh Corporation as a reference standard substance.

Upon the aforementioned measurement of the weight-average molecular weight of the polymer, as a sample to be measured, there can be used a solution prepared by mixing 0.1 g of the polymer with 10 mL of the aforementioned eluent in a glass vial, stirring the resulting mixture with a magnetic stirrer at 25° C. for 10 hours, and then subjecting the mixture to filtration treatment through a syringe filter "DISMIC-13HP" (PTFE; 0.2 μm) available from Advantec Co., Ltd.

In the case where the aforementioned colorant is used in the form of colorant particles, the volume-average particle size of the colorant particles is preferably not less than 10 nm and more preferably not less than 50 nm, and is also preferably not more than 1,000 nm and more preferably not more than 900 nm.

The volume-average particle size of the colorant particles may be measured by the method described in Examples below.

As the ink containing the inorganic pigment according to the present invention, there may also used a water-based ink.

The term "water-based" as used in the present specification means that water has a largest content among components of a medium contained in the water-based ink.

(Production of Ink Containing Inorganic Pigment)

The ink containing the inorganic pigment according to the present invention contains a colorant water dispersion prepared, for example, by dispersing at least the inorganic pigment as the colorant with a water-dispersive polymer, and may be produced by adding an organic solvent, water and various additives to the colorant water dispersion according to the requirements.

The term "water-dispersive polymer" as used in the present specification means a polymer with which the colorant can be dispersed in a water-based medium. From the viewpoint of improving dispersibility of the colorant, the water-dispersive polymer that may be used in the ink is preferably an ionic group-containing polymer, more preferably an anionic group-containing anionic polymer or a cationic group-containing cationic polymer. Examples of the anionic group-containing anionic polymer and the cationic group-containing cationic polymer include the same polymers as illustrated above as to the dispersive polymer.

Incidentally, in the case where the aforementioned ink contains the other colorant in addition to the inorganic pigment, the ink preferably further contains a colorant water dispersion prepared by dispersing the other colorant with the water-dispersive polymer.

The colorant water dispersion using the inorganic pigment and the other colorant may be produced by subjecting the pigment and the water-dispersive polymer, if required together with a neutralizing agent, a surfactant, etc., to dispersion treatment by conventionally known methods. More specifically, the colorant water dispersion is preferably produced by a process including the following step I and step II, though it is not necessarily limited thereto.

Step I; subjecting a colorant mixture containing water, the colorant, the water-dispersive polymer and an organic solvent to dispersion treatment to obtain a colorant dispersion liquid; and Step II; removing the organic solvent from the colorant dispersion liquid obtained in the step I to obtain the colorant water dispersion.

It is desired that the organic solvent used in the step I has high affinity to the water-dispersive polymer and good wettability to the colorant. As the organic solvent, from the viewpoint of improving wettability to the colorant and adsorptivity of the water-dispersive polymer upon the coloration as well as from the viewpoint of improving safety problems owing to the residual organic solvent when conducting the makeup printing on the skin, preferred are ethanol and isopropanol, and more preferred is ethanol.

In the case where a hydrophobic pigment, such as a hydrophobized titanium oxide, zinc oxide, etc., is used as the inorganic pigment, it is preferred that the step I includes the following steps I-1 and I-2 in which a cationic silicone polymer and an anionic polymer are used in combination with each other as the water-dispersive polymer.

Step I-1; suspending the hydrophobized hydrophobic pigment using the cationic silicone polymer to obtain a suspension of the hydrophobic pigment; and Step I-2; adding the anionic polymer to the suspension of the hydrophobic pigment obtained in the step I-1 to obtain the colorant mixture, and then subjecting the colorant mixture to dispersion treatment to obtain the colorant dispersion liquid.

By conducting the step I-1, a hydrophobic silicone moiety of the cationic silicone polymer is adsorbed onto the surface of the hydrophobic pigment, whereas a hydrophilic cationic moiety of the cationic silicone polymer is oriented to the side of the medium, so that the pigment particles can be suspended in such a stable state that the particles possess a positive zeta potential. Then, by adding the anionic polymer in the step I-2, the anionic polymer is adsorbed onto the cationic groups of the cationic silicone polymer adsorbed onto the hydrophobic pigment to thereby disperse the pigment particles in such a state that the particles possess a negative zeta potential, whereby it is possible to obtain a stable dispersion even when using the hydrophobic pigment.

As a means for applying a shear stress in the dispersion treatment of the step I, there may be used, for example, kneading machines, such as roll mills. kneaders, extruders, etc., high-pressure homogenizers, such as "MICROFLUIDIZER" (tradename) available from Microfluidics Corporation, etc., and media-type dispersers, such as paint shakers, beads mills, etc. Among these apparatuses, the high-pressure homogenizers are preferably used from the viewpoint of reducing a particle size of the colorant.

In the case where the dispersion treatment is conducted using the high-pressure homogenizer, the particle size of the colorant can be adjusted to a desired value by controlling the treating pressure and the number of passes through the homogenizer in the dispersion treatment.

The method of removing the organic solvent in the step II is not particularly limited, and may be conducted by any suitable conventionally known methods. Incidentally, a part of water contained in the colorant dispersion liquid may be removed together with the organic solvent at the same time.

The temperature and time used upon removal of the organic solvent may be appropriately selected according to the kind of organic solvent to be used.

(Composition and Properties of Ink Containing Inorganic Pigment)

The content of the colorant in the ink is preferably not less than 3% by mass, more preferably not less than 5% by mass and even more preferably not less than 7% by mass, and is also preferably not more than 20% by mass, more preferably not more than 17% by mass, even more preferably not more than 15% by mass, further even more preferably not more than 13% by mass and still further even more preferably not more than 10% by mass, from the viewpoint of improving storage stability and ejection properties of the ink as well as from the viewpoint of enhancing optical density of the ink upon printing.

The content of the inorganic pigment in the ink is preferably not less than 3% by mass, more preferably not less than 5% by mass, even more preferably not less than 6% by mass and further even more preferably not less than 7% by mass, and is also preferably not more than 20% by mass, more preferably not more than 17% by mass, even more preferably not more than 15% by mass, further even more preferably not more than 13% by mass and still further even more preferably not more than 10% by mass, from the viewpoint of improving storage stability and ejection properties of the ink as well as from the viewpoint of enhancing optical density of the ink upon printing.

The mass ratio of to the content of the colorant to the content of the water-dispersive polymer [colorant/water-dispersive polymer] in the ink is preferably not less than 1, more preferably not less than 1.5 and even more preferably not less than 2, and is also preferably not more than 4, more preferably not more than 3.5 and even more preferably not more than 3, from the viewpoint of improving storage stability and ejection properties of the ink.

The content of water in the ink is preferably not less than 50% by mass, more preferably not less than 55% by mass, even more preferably not less than 60% by mass, further even more preferably not less than 65% by mass and still further even more preferably not less than 70% by mass, and is also preferably not more than 90% by mass, more preferably not more than 85% by mass and even more preferably not more than 80% by mass, from the viewpoint of improving storage stability and ejection properties of the ink.

The static surface tension of the aforementioned ink as measured at 20° C. is preferably not less than 25 mN/m, more preferably not less than 30 mN/m and even more preferably not less than 32 mN/m, and is also preferably not more than 45 mN/m, more preferably not more than 40 mN/m and even more preferably not more than 38 mN/m, from the viewpoint of improving ejection properties of the ink.

The viscosity of the ink as measured at 35° C. is preferably not less than 1 mPa·s, more preferably not less than 1.5 mPa·s and even more preferably not less than 2 mPa·s, and is also preferably not more than 20 mPa·s, more preferably not more than 15 mPa·s and even more preferably not more than 10 mPa·s, from the viewpoint of improving ejection properties of the ink.

The static surface tension of the ink as measured at 20° C. and the viscosity of the ink as measured at 35° C. may be measured by the respective methods described in Examples below.

The aforementioned ink may also contain various additives that are usually used in inks from the viewpoint of well controlling properties of the ink. Examples of the additives include a wetting agent, a penetrant, a dispersant, such as a surfactant, etc., a viscosity controller, such as hydroxypropyl cellulose, hydroxyethyl cellulose, polyvinyl alcohol, etc., a defoaming agent, such as a silicone oil, etc., a mildew-proof agent, a rust preventive, and the like.

Examples of the wetting agent and the penetrant include polyhydric alcohols and ethers or acetates of the polyhydric alcohols, such as ethylene glycol, propylene glycol (1,2-propanediol), 1,2-hexanediol, diethylene glycol, triethylene glycol, polyethylene glycol, glycerin, trimethylol propane, diethylene glycol diethyl ether, etc. Of these wetting agents and penetrants, preferred are propylene glycol (1,2-propanediol), 1,2-hexanediol, polyethylene glycol, glycerin, triethylene glycol and trimethylol propane.

In addition, the polyhydric alcohols may also be used in the form of an alkyleneoxide adduct of the polyhydric alcohols. Examples of the preferred alkyleneoxide adduct of the polyhydric alcohols include a glycerin-modified ethyleneoxide adduct.

Examples of the surfactant include a nonionic surfactant, such as an ethyleneoxide adduct of acetylenediol, a polyoxyethylene alkyl ether, etc., and the like.

The volume-average particle size of the colorant particles in the aforementioned ink in the case of using a non-white colorant therein is preferably not less than 30 nm, more preferably not less than 50 nm and even more preferably not less than 60 nm, and is also preferably not more than 250 nm, more preferably not more than 200 nm and even more preferably not more than 180 nm, from the viewpoint of suppressing clogging of nozzles to thereby improve ejection properties of the ink as well as from the viewpoint of improving dispersion stability of the colorant particles.

The volume-average particle size of the colorant particles in the aforementioned ink in the case of using a white colorant therein is preferably not less than 150 nm, more preferably not less than 240 nm and even more preferably not less than 290 nm, and is also preferably not more than 1,000 nm, more preferably not more than 500 nm, even more preferably not more than 350 nm and further even more preferably not more than 330 nm, from the same viewpoint as described above.

The volume-average particle size of the colorant particles in the ink may be measured by the method described in Examples below.

<Ink Circulation Device>

The construction of flow paths of an ink circulation system of the cosmetic handy ink-jet printer 1 according to the first embodiment is explained below by referring to FIG. 3. As the ink circulation device 10 according to the first embodiment, the construction in which the ink receptacle 100 and the ink-jet head 101 are provided separately from each other is explained. In this embodiment, for the sake of convenience, the construction for a single color ink only is shown. However, in fact, the same construction is also provided for each color ink. In addition, the arrow shown in the figure indicates an approximate direction of a flow of the ink.

Figure 3:
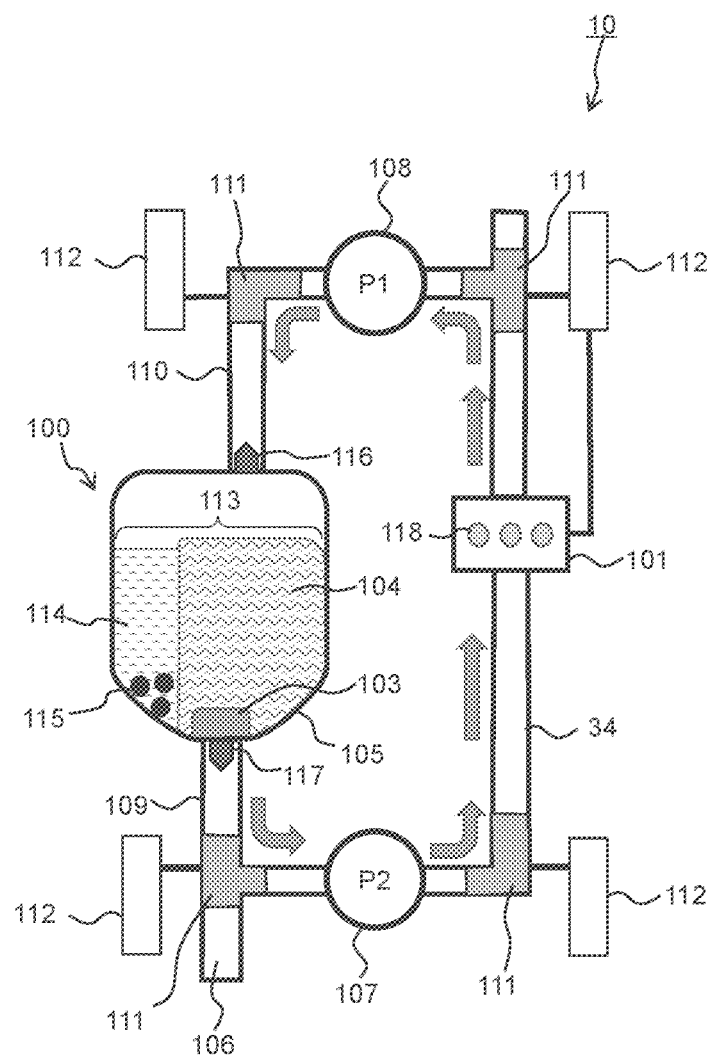
FIG. 3 is a schematic view of a construction including an ink receptacle and an ink circulation path which are adapted to the cosmetic handy ink-jet printer according to the first embodiment of the present invention.

As shown in FIG. 3, the ink circulation device 10 includes an ink circulation path 34 which is constructed of the ink receptacle 100 for accommodating an ink 113 containing an inorganic pigment, the ink-jet head 101 for ejecting the ink 113, a first ink transport tube 109 connecting the ink receptacle 100 to the ink-jet head 101, and a second ink transport tube 110 connecting the ink-jet head 101 to the ink receptacle 100.

Examples of materials of the first ink transport tube 109 and the second ink transport tube 110 may include a metal, a resin, and the like. In the case where the ink contains components having high corrosiveness against metals, such as acids, alkalis, etc., these tubes are preferably formed of a resin having high chemical resistance, and it is also preferred that these tubes are metal tubes whose inside portion is coated with a resin having high chemical resistance.

If the inside portion of each of the first ink transport tube 109 and the second ink transport tube 110 is formed of a resin, streaming electrification tends to be caused owing to the friction between the respective conduits and the ink circulated and flowed therethrough. For this reason, it is preferred that a conductive conduit 111 is disposed for eliminating static electricity generated in the ink circulated. The conductive conduit 111 is preferably provided for eliminating static electricity at least over a whole circumferential portion of each of the first ink transport tube 109 and the second transport tube 110. The conductive conduit 111 is preferably disposed at a portion where a turbulence flow of the ink tends to be caused, such as a curved conduit, connecting portions between respective conduits, etc. The conductive conduit 111 is preferably connected to a grounded circuit 112 for releasing electrical charges. When the conductive conduit 111 is connected to the grounded circuit 112, the electrical charges stored in the ink 113 circulated are released therethrough, whereby the ink 113 circulated can be prevented from staying in the circulation path owing to electrification thereof, so that the circulation flow of the ink can be improved.

The ink receptacle 100 is equipped with a tubular metal filter 103 disposed at a connecting position to the first ink transport tube 109, an ink absorber 104 disposed for retaining the ink, preventing precipitation of the ink, adjusting flow of the ink and controlling a negative pressure, and a mortar-like ink receptacle bottom portion 105 for collecting the precipitated pigment in a lower portion of the flow path when vertically disposed. The ink receptacle 100 is provided on one end thereof with a first connecting conduit 117 through which the ink receptacle is connected to the first ink transport tube 109. In addition, the ink receptacle 100 is provided on the other end thereof with a second connecting conduit 116 through which the ink receptacle is connected to the second ink transport tube 110.

The ink absorber 104 is preferably in the form of an open-cell foam body in which cells are mutually communicated with each other. Examples of the open-cell foam body include resin foams, such as an open-cell foam body of thermoplastic polyurethane, an open-cell foam body of decarboxylated calcium carbonate/thermoplastic polyurethane, an open-cell foam body of decarboxylated calcium carbonate/polyolefin, a nitrile rubber sponge, an open-cell foam body of a chemical foam/thermoplastic plastic which is obtained by adding a foaming agent to a thermoplastic plastic, a mechanically foamed rubber sponge of a rubber latex, a mechanically foamed body of a polyvinyl chloride paste, etc.

The first ink transport tube 109 is equipped with a recessed portion 106 for temporarily recovering the precipitated inorganic pigment, and a pump 107 serving, on the one hand, for feeding the ink 113 from the ink receptacle 100 to the side of the ink-jet head 101 upon circulation of the ink, and on the other hand, for communicating the ink-jet head 101 and the ink receptacle 100 to each other with a valve being opened upon ejection of the ink to thereby make control of a negative pressure by the ink absorber 104 in the ink receptacle 100 effective.

The second ink transport tube 110 is equipped with a pump 108 serving, on the one hand, for feeding the ink 113 from the ink-jet head 101 to the side of the ink receptacle 100 upon circulation of the ink, and on the other hand, for closing the valve upon ejection of the ink to prevent leakage of the ink from nozzles 118 of the ink-jet head 101. The provision of the pump 108 may be omitted, and in this case, only the valve may be disposed.

The circulation mechanism provided by the ink circulation device includes the ink receptacle 100, the ink-jet head 101, the first ink transport tube 109 and the second ink transport tube 110. The circulation flow path of the circulation mechanism is preferably partially disposed in the direction against gravity.

Figure 4:
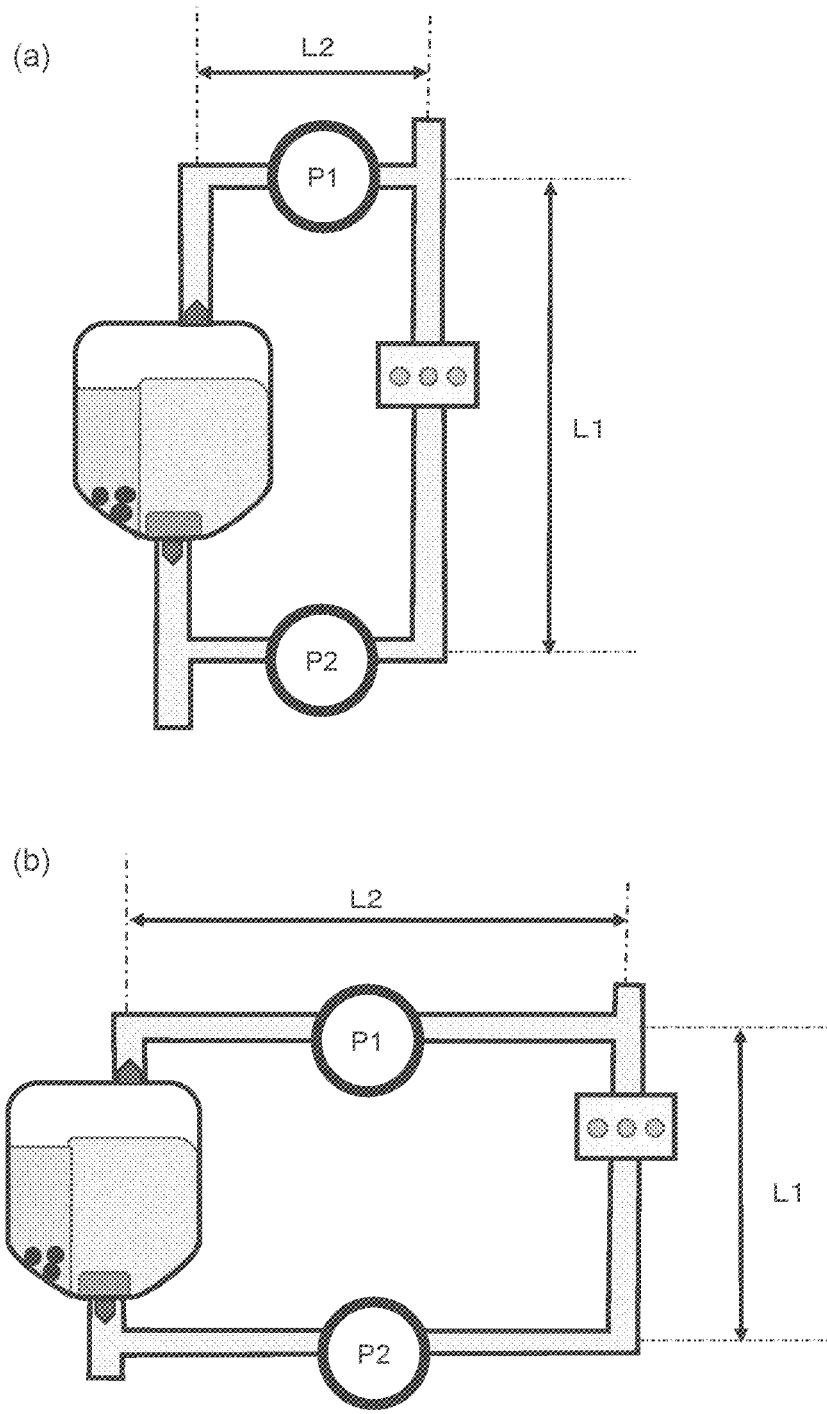
FIG. 4 is an explanatory view of a construction extending in a direction of a length of a conduit in a flow path of an ink circulation system of the cosmetic handy ink-jet printer according to the first embodiment of the present invention.

Referring to FIG. 4(a) and FIG. 4(b), there are shown a conduit length L1 of the circulation flow path extending the direction against gravity and a conduit length L2 of the circulation flow path extending the direction perpendicular to the direction of gravity (horizontal direction). More specifically, the case in which the conduit length L1 is longer than the conduit length L2 is shown in FIG. 4(a), and the case in which the conduit length L1 is shorter than the conduit length L2 is shown in FIG. 4(b). When the conduit is disposed in an inclined state, the flow vector may be decomposed into a component in the direction against gravity and a component in the direction perpendicular to the direction of gravity to grasp a degree of contribution of the respective components. When conducting circulation of the ink, at least a part of the circulation flow path is disposed in the direction against gravity to form an ink flow in the direction against gravity, so that it is possible to prevent precipitation of the inorganic pigment.

From the aforementioned viewpoint, in the circulation mechanism provided by the ink circulation device, upon circulation of the ink, it is preferred that not less than 25% of a whole length of the circulation flow path is disposed in the direction against gravity, it is more preferred that not less than 50% of a whole length of the circulation flow path is disposed in the direction against gravity, and it is even more preferred that not less than 75% of a whole length of the circulation flow path is disposed in the direction against gravity.

In the case where the waiting time of the cosmetic handy ink-jet printer 1 is a predetermined time or longer, it is preferred that the ink 113 is automatically circulated by the ink circulation device 10. By appropriately circulating the ink 113 by the ink circulation device 10, it is possible to inhibit the ink 113 from being dried in the ink circulation device 10, improve ejection properties of the ink, and thereby reducing generation of the ink mist.

The ink receptacle 100 is filled with the ink 113, and a part of the ink 113 is absorbed and retained in the ink absorber 104. In addition, a liquid ink 114 as a part of the ink 113 which is unabsorbed in the ink absorber 104 is also accommodated in the ink receptacle 100.

The liquid ink 114 preferably includes at least one sphere 115 serving for redispersing the precipitated inorganic pigment therein. By allowing the sphere 115 to be present in the liquid ink 114, when shaking the ink receptacle 100, or the hand-held unit of the cosmetic handy ink-jet printer 1 equipped with the ink receptacle 100, it is possible to redisperse the precipitated inorganic pigment in the liquid ink 114. The sphere 115 is not particularly limited. For example, the sphere may have a size capable of allowing it to freely move in the ink receptacle 100, and may be formed of a material that permits redispersion of the precipitated inorganic pigment. More specifically, as the material of the sphere 115, there may be mentioned a stainless steel metal sphere having a diameter of about 5 mm, and the about three metal spheres are preferably contained in the ink.

The ink-jet head 101 is not particularly limited. As the ink-jet head 101, there may be used those ink-jet heads of a thermal ink-jet type, a piezoelectric type and various other types. As an example of the ink-jet head 101, an ink-jet head of a thermal ink-jet type in which air bubbles are generated by a heater element as an energy generating element to eject the ink is explained hereinbelow.

Figure 5:
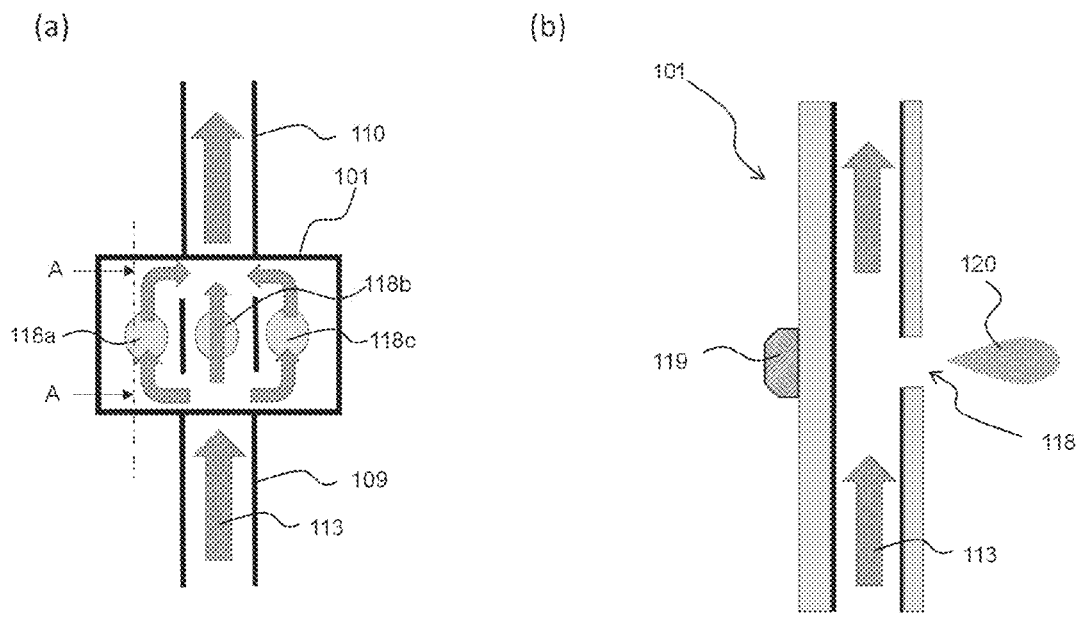
FIG. 5 is an explanatory view of a mechanism of an ink-jet head of the cosmetic handy ink-jet printer according to the first embodiment of the present invention.

FIG. 5 (a) is an enlarged view of the ink-jet head 101 shown in FIG. 3. For the sake of convenience when being shown in the figure, there is illustrated the ink-jet head in which three nozzles 118 (including a nozzle 118a, a nozzle 118b and a nozzle 118c) are provided. However, in an actual ink-jet head, the number of nozzles 118 is much larger, and there may be adopted, for example, the ink-jet head 101 having 640 nozzles. As shown in FIG. 5 (a), the ink 113 is fed from below through the first ink transport tube 109, divided into separate flows at an inlet port of the ink-jet head 101, and equally distributed and introduced into branched flow paths in the ink-jet head 101. Then, the ink 113 is flowed through positions inside of the ink-jet head 101 where the respective nozzles 118a, 118b and 118c are provided, and returned to the second ink transport tube 110 from an upper portion of the ink-jet head 101. In this case, a length of an ink flow path of each of the nozzle 118a and the nozzle 118c which are disposed on opposite end sides of the ink-jet head 101 is longer than a length of an ink flow path of the nozzle 118b. Therefore, if these nozzles have the same ink flow path diameter, the flow resistance at each of the nozzle 118a and the nozzle 118c which are disposed on opposite end sides of the ink-jet head 101 becomes larger than the flow resistance at the nozzle 118b. For this reason, the flow path diameters of the respective nozzles are calculated and designed such that the flow resistances at the respective nozzles are equal to each other.

FIG. 5 (b) is a cross-sectional view of the ink-jet head 101 as viewed from the direction A-A of FIG. 5 (a). In FIG. 5 (b), a heater 119 is disposed at the backside position opposed to an opening portion of the respective nozzles 118 of the ink-jet head 101, and when energizing the heater 119, air bubbles are generated in the conduit to thereby eject ink droplets 120.

As the condition in which deterioration in ejection properties of the ink is caused in the ink-jet head 101, there is considered defective ejection of the ink 113 in association with drying of the ink 113 in the nozzles 118. When the ink 113 is dried in the nozzles 118, the viscosity of the ink is increased, so that responsiveness of meniscus of the ink in the nozzles 118 against an external force applied by the ink-jet head 101 tends to be deviated from a designed value. As a result, the ink droplets 120 tend to undergo the change in ejecting condition thereof, so that defects, such as no ejection of the ink, deflected ejection of the ink, occurrence of ink mist, etc., tend to be caused.

The ink circulation device 10 according to the present embodiment is adapted such that in the ink-jet head 101, the ink 113 circulated therethrough is pushed out from the nozzles 118 by an external force applied to the ink 113 by the heater 119, etc., and cut into the respective ink droplets 120, to thereby complete the ejection of the ink. That is, in the ink circulation device 10, by circulating the ink 113 therethrough, it is possible to prevent increase in viscosity of the ink 113, and lessen the difference in ejection conditions from those designed preliminarily. For this reason, the ink can be stably ejected, and occurrence of the ink mist can be inhibited.

The opening portions of the nozzles 118 in the ink-jet head 101 are preferably disposed in the lateral direction perpendicular to the vertical direction (horizontal direction) upon printing and upon stand-by state. When the opening portions of the nozzles 118 in the ink-jet head 101 are disposed in the lateral direction perpendicular to the vertical direction, it is possible to minimize the amount of the inorganic pigment precipitated in the ink 113.

In addition, the ink-jet head 101 is preferably designed such that the ink 113 is allowed to enter into the ink-jet head 101 from the vertically downward direction, and flow in the vertically upward direction. By controlling the direction of the ink 113 entering into the ink-jet head 101 to the vertically upward direction, a capillary force exerted to the ink 113 when entering into the ink-jet head 101 acts as a resisting force against a force of precipitating the inorganic pigment, so that it is possible to suppress precipitation of the inorganic pigment by the ink ejecting action even when stopping the circulation of the ink. That is, when the direction of the ink 113 entering into the ink-jet head 101 is controlled to the vertically upward direction, it is possible to minimize the amount of the inorganic pigment precipitated in the ink 113.

The circulating action of the ink by the ink circulation device 10 is preferably performed at the intervals of a predetermined constant time when vertically disposing the hand-held unit 3 in the dock unit 2. The circulating action of the ink by the ink circulation device 10 is stopped when dismounting the hand-held unit 3 from the dock unit 2. In addition, it is preferred that the ink-jet printer has such a function that when the condition that the hand-held unit 3 is continuously dismounted from the dock unit 2 for a predetermined time period or longer, alarm, such as sound, light, etc., is emitted from the hand-held unit 3, whereby the owner is requested to return the hand-held unit 3 back to the original position in the dock unit 2. The alarm from the hand-held unit 3 is preferably noticed to the owner via a smartphone or a smart speaker to inform the owner of it.

<Body Deelectrification Device>

The cosmetic handy ink-jet printer 1 according to the first embodiment is equipped with a body deelectrification device in order to control electrical charges generated in the printer in itself.

In view of improvement in usability, the cosmetic handy ink-jet printer 1 can be hardly used under such an environmental condition that the printer is connected to earth via a wire. Therefore, as shown in FIG. 1, there may be adopted such a construction in which a capacitor 505 is disposed as a body deelectrification device in the vicinity of the ink-jet head 101 in the hand-held unit 3. As the capacitor 505, there may be mentioned, for example, a multi-layer ceramic chip capacitor. With the construction in which the capacitor 505 is disposed as the body deelectrification device in the hand-held unit 3, electrification charges generated upon conducting the makeup printing can be retained in the capacitor 505, whereby the capacitor 505 can be used as a pseudo earth. When the cosmetic handy ink-jet printer 1 is equipped with the capacitor 505 as the body deelectrification device, electrification charges generated in the cosmetic handy ink-jet printer 1 can be eliminated by connecting to the pseudo earth, so that it is possible to prevent breakage of circuits in the apparatus owing to static electricity therein as well as occurrence of the ink mist.

In addition, since the cosmetic handy ink-jet printer 1 can be hardly used under the environmental condition that the printer is connected to earth via a wire, as shown in FIG. 1, there may be adopted the construction in which the grounded circuit 25 is mounted as the body deelectrification device to the dock unit 2 separately from the hand-held unit 3. When adopting such a construction that the grounded circuit 25 is mounted as the body deelectrification device to the dock unit 2, it is possible to eliminate electrification charges generated in the hand-held unit 3 by connecting the hand-held unit 3 to the dock unit 2. By providing the grounded circuit 25 as the body deelectrification device, electrification charges generated in the cosmetic handy ink-jet printer 1 can be eliminated by connecting to earth, so that it is possible to prevent breakage of circuits in the apparatus owing to static electricity generated therein as well as occurrence of the ink mist.

Moreover, the capacitor 505 in the hand-held unit 3 is used as the pseudo earth, and further the dock unit 2 is equipped with the grounded circuit 25. For this reason, even in the case where the ink is circulated inside of the printer and the head for preventing precipitation of the inorganic pigment therein whereby electrification charges are generated owing to the flow of the liquid, the thus generated electrification charges can be rapidly eliminated, and the ink can be stably ejected, so that it is possible to suppress occurrence of the ink mist.

In addition, in order to improve the deelectrifying effect by the body deelectrification device, it is preferred that the other deelectrification device for eliminating static electricity is further disposed in the hand-held unit separately from the aforementioned body deelectrification device. In order to provide such a deelectrification device, a part of a handle portion (grip portion 35) of the hand-held unit 3 is preferably formed of a conductive material. In the case where a part of the grip portion 35 of the hand-held unit 3 is formed of a conductive material, from the viewpoint of improving the deelectrifying effect, the conductive material is preferably electrically connected to the dock unit 2 and the hand-held unit 3.

More specifically, when the hand-held unit 3 is dismounted from the dock unit 2 or the ink receptacle 100 is replaced with a new one, if the hand of the user is in an electrified state and therefore takes on static electricity, there tends to be caused such a fear that the static electricity tends to cause unintended electrification of the hand-held unit 3, or a circuit board mounted on the ink-jet head 101 is broken by occurrence of electrical discharge therein. For this reason, it is preferred that the grip portion of the hand-held unit 3 is formed of a conductive material for avoiding occurrence of these defects upon dismounting the hand-held unit 3 or replacing the ink receptacle. As the conductive material, there may be used a conductive resin. The surface resistivity value of the conductive material is preferably not less than $10^5 \Omega/\square$ and not more than $10^{11} \Omega/\square$.

When the grip portion 35 of the hand-held unit 3 is formed of the conductive material, even in the case where the user is in an electrified state, electrification charges on the user can be rapidly eliminated by connecting to earth before using the printer, and it is therefore possible to prevent breakage of circuits of the apparatus owing to the static electricity or occurrence of the ink mist.

<Procedures for Filling Ink Receptacle and Printing>

The procedures from filling of the ink receptacle 100 of the cosmetic handy ink-jet printer 1 through initiation of printing are explained by referring to FIG. 3.

At first, when mounting the ink receptacle 100 to the cosmetic handy ink-jet printer 1, the ink receptacle 100 is shaken by hand about 50 times to redisperse the pigment precipitated upon storage using the spheres 115 in the ink receptacle 100.

Then, the second connecting conduit 116 provided at the end portion of the ink receptacle 100 is connected to the second ink transport tube 110, and the first connecting conduit 117 provided at the other end portion of the ink receptacle 100 is connected to the first ink transport tube 109.

Next, the ink 113 is circulated inside of the ink circulation device 10 by means of the pumps 107 and 108. More specifically, the ink 113 is flowed in the direction of from a lower portion of the ink receptacle 100 to an upper portion of the ink receptacle 100 through the ink-jet head 101 and then returned into the ink receptacle 100.

The cosmetic handy ink-jet printer 1 is capable of conducting makeup printing by pressing rollers disposed in front of the ink-jet head 101 against a substrate to be printed, such as a skin, a hair, a nail, etc. The rollers serve for applying a pressing force to the substrate and maintaining a surface of the substrate in a pseudo flat shape, so that it is possible to conduct printing on the surface of the substrate while preventing the substrate from contacting with the nozzles 118 of the ink-jet head 101.

When the amount of the ink 113 in the ink receptacle 100 is reduced during the continuous printing operation, the change in inside pressure of the ink receptacle 100 as well as the change in ejecting condition of the ink are caused, so that there tends to occur such a fear that defective ejection of the ink or generation of the ink mist are caused. For this reason, by expecting the change in inside pressure of the ink receptacle 100 from the number of ink droplets ejected, replacement of the ink receptacle 100 can be prompted to compensate the change in inside pressure thereof.

The cosmetic handy ink-jet printer according to the first embodiment of the present invention is equipped with the ink circulation device and the body deelectrification device. With such a construction of the cosmetic handy ink-jet printer according to the first embodiment, it is possible to exhibit excellent ejection properties of the ink even when ejecting the ink containing the inorganic pigment in an ink-jetting manner, and thereby reduce occurrence of the ink mist by-produced in association with the action of ejection of the ink.

Modification of First Embodiment

Figure 6:
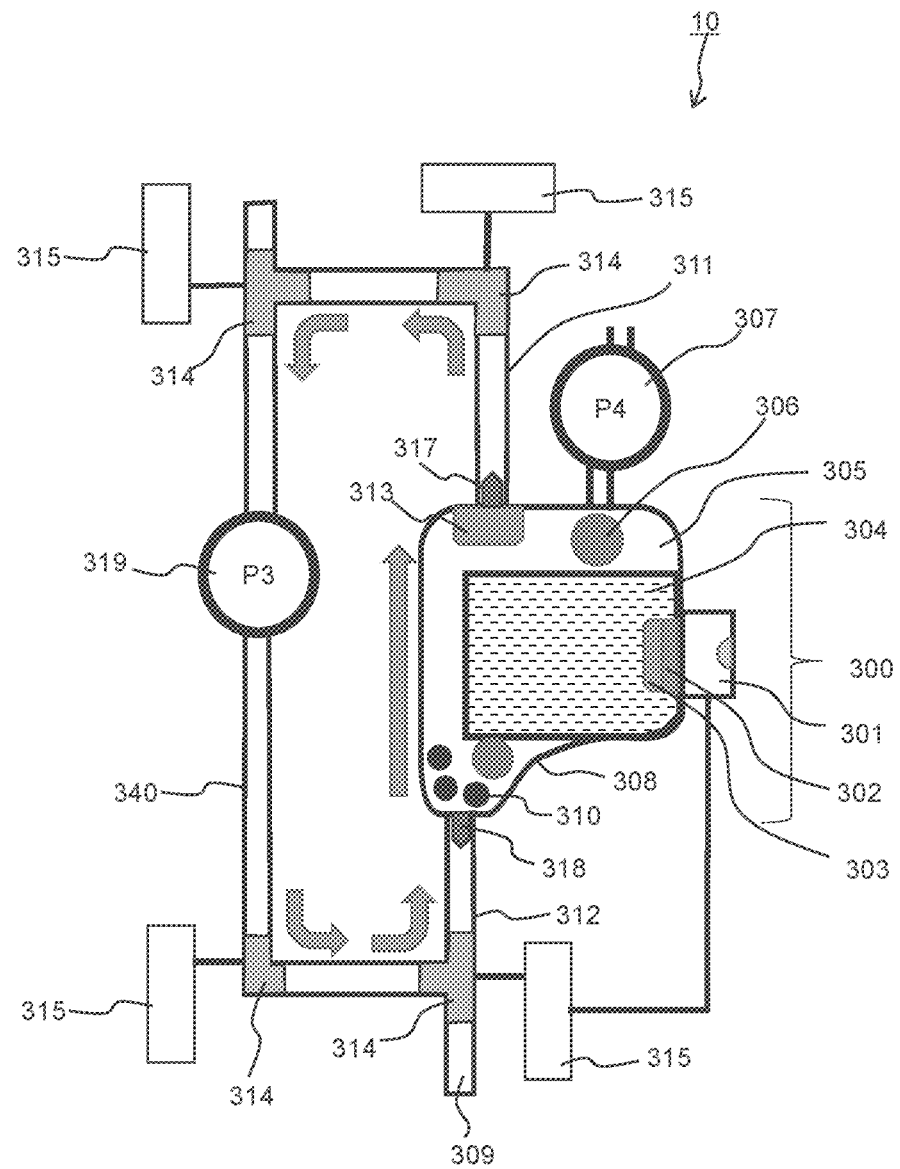
FIG. 6 is a schematic view of a construction including an ink receptacle and an ink circulation path which are adapted to a cosmetic handy ink-jet printer according to a modification of the first embodiment of the present invention.

In the cosmetic handy ink-jet printer according to a modification of the first embodiment of the present invention, as shown in FIG. 6, an ink receptacle 300 and an ink-jet head 301 are integrated with each other.

The construction of flow paths in a circulation system of the printer is explained by referring to FIG. 6. For the sake of convenience, the construction for a single color ink only is shown in FIG. 6. However, in fact, the same construction is also provided for each of color inks.

The cosmetic handy ink-jet printer according to the modification of the first embodiment of the present invention includes the ink receptacle 300, the ink-jet head 301, an ink transport tube 302 connected to the ink-jet head 301, a tubular metal filter 303 disposed in the ink transport tube 302 connected to the ink-jet head 301, an ink absorber 304 disposed for retaining the ink, preventing precipitation of the inorganic pigment, adjusting flow of the ink and controlling a negative pressure, an air bag 305 and an elastomer 306 serving for controlling a negative pressure in the ink receptacle when the amount of the ink received therein is reduced, a valve and a pump 307 for introducing outside air to the air bag, a mortar-like ink receptacle bottom portion 308 for collecting the precipitated pigment in a lower portion of a flow path when vertically disposed, a recessed portion 309 in which the precipitated pigment is temporarily recovered, spheres 310 for promoting stirring of the ink in the ink receptacle when being shaken by hand, a first ink transport tube 311 through which the ink is pushed out from the ink receptacle 300 to an ink circulation path 340, and a second ink transport tube 312 through which the ink is returned from the ink circulation path 340 to the ink receptacle 300.

A tubular metal filter 313 is disposed at a connecting position to the first ink transport tube 311.

Conductive conduits 314 are partially disposed in the circulation flow path, and the respective conductive conduits 314 are connected to a grounded circuit 315 of a dock unit.

As shown in FIG. 7(a) and FIG. 7(b), the ink receptacle 300 is filled with an ink 316, and a part of the ink 316 is absorbed and retained in the ink absorber 304. In addition, a liquid ink 316 as a part of the ink 316 which is unabsorbed with the ink absorber 304 is also accommodated in the ink receptacle 300. The liquid ink 316 may include the at least one sphere 310 serving for redispersing the precipitated inorganic pigment. By allowing the sphere 310 to be present in the liquid ink 316, when shaking the hand-held unit of the cosmetic handy ink-jet printer 1 equipped with the ink receptacle 300, it is possible to redisperse the precipitated inorganic pigment in the liquid ink 316. The sphere 310 is not particularly limited. For example, the sphere may have a size capable of allowing it to freely move in the ink receptacle 300, and may be formed of a material that permits redispersion of the precipitated inorganic pigment. More specifically, as the material of the sphere 310, there may be mentioned a stainless steel metal sphere having a diameter of about 5 mm, and the about three metal spheres are preferably contained in the ink.

<Procedures for Filling Ink Receptacle and Printing>

Figure 7:
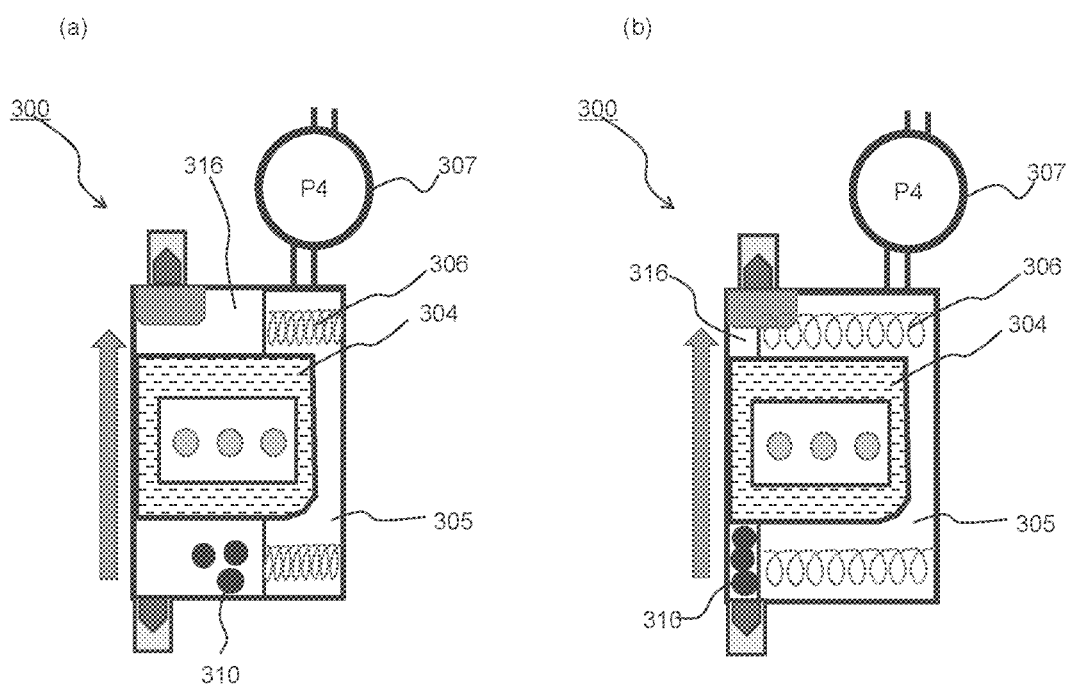
FIG. 7 is an explanatory view of a mechanism of an ink receptacle of the cosmetic handy ink-jet printer according to the modification of the first embodiment of the present invention.

The procedures from filling of the ink receptacle 300 of the cosmetic handy ink-jet printer 1 through initiation of printing according to the modification of the first embodiment are explained by referring to FIG. 6 and FIG. 7.

At first, when mounting the ink receptacle 300 to the cosmetic handy ink-jet printer, the ink receptacle 300 is shaken by hand about 50 times to redisperse the pigment precipitated upon storage using the spheres 310 in the ink receptacle 300.

Then, a first connecting conduit 317 provided at one end portion of the ink receptacle 300 is connected to the first ink transport tube 311, and a second connecting conduit 318 provided at the other end portion of the ink receptacle 300 is connected to the second ink transport tube 312.

Next, the ink 316 is circulated from the ink circulation path 340 to the ink receptacle 300 by means of a pump 319. More specifically, the ink 316 is flowed in the direction of from an upper portion of the ink receptacle 300 to a lower portion of the ink receptacle 300 through the pump 319, and then returned into the ink receptacle 300. The circulating action of the ink is performed at the intervals of a predetermined constant time when vertically mounting the hand-held unit 3 in the dock unit 2. The circulating action of the ink is stopped when dismounting the hand-held unit 3 from the dock unit 2. When the condition that the hand-held unit 3 is continuously dismounted from the dock unit for a predetermined time period or longer, alarm, such as sound or light, is emitted from the hand-held unit 3, and the alarm is noticed to the owner via a smartphone or a smart speaker of the owner, whereby the owner is requested to return the hand-held unit 3 back to the original position in the dock unit 2.

In the cosmetic handy ink-jet printer 1, the hand-held unit 3 is dismounted from the dock unit 2, and rollers disposed in front of the ink-jet head 301 are pressed against a substrate to be printed, such as a skin, a hair, a nail, etc., to thereby conduct makeup printing thereon. The rollers serve for applying a pressing force to the substrate and maintaining a surface of the substrate in a pseudo flat shape, so that it is possible to conduct makeup printing on the surface of the substrate while preventing the substrate from contacting with the nozzles of the ink-jet head 301.

When the amount of the ink 316 in the ink receptacle 300 is reduced during the continuous printing operation, a level surface of the ink 316 fails to reach the first connecting conduit 317, so that the circulation mechanism becomes inoperative. In this case, outside air is blown into the air bag 305 through the pump 307 to inflate the air bag 305, so that an inner space of the ink receptacle 300 is narrowed. As a result, the ink 316 is filled so as to reach the first ink transport tube 311, so that the circulation mechanism becomes operative again, whereby the condition that the ink 316 can be ejected from the ink-jet head 301 without generating the ink mist can be maintained. In addition, when the ink 316 is reduced until the number of ink droplets ejected reaches an estimated number thereof at which it is expected that the aforementioned function can be no longer achieved only by inflation of the air bag 305, the user is prompted to conduct replacement of the ink receptacle 300.

Second Embodiment

Figure 8:
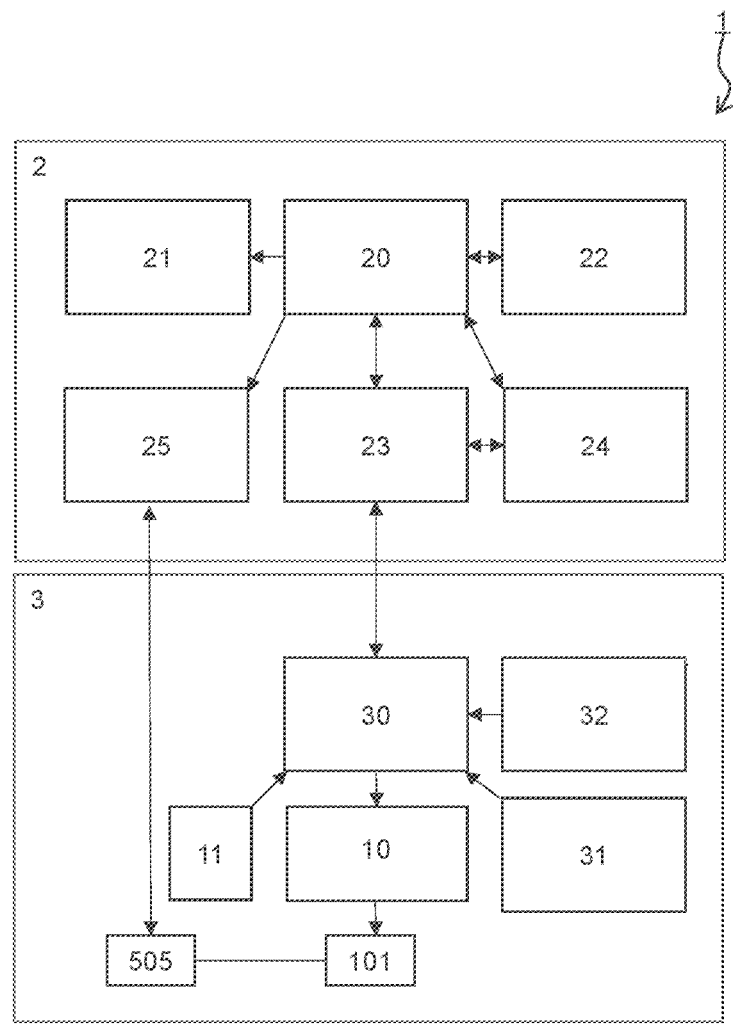
FIG. 8 is a block diagram showing a construction of a cosmetic handy ink-jet printer according to a second or third embodiment of the present invention.

The second embodiment is different from the first embodiment in that the printer of the second embodiment is further equipped with a mist recovery device 11, as shown in FIG. 8. In the following, the difference of the second embodiment from the first embodiment is explained. In addition, in the following explanation of various different embodiments, members having the same structure are designated by the same reference numeral.

<Mist Recovery Device>

The mist recovery device 11 of the cosmetic handy ink-jet printer 1 according to the second embodiment of the present invention serves for recovering the ink mist by-produced in association with the action of ejection of the ink from the ink-jet head 101 by means of a jig, such as a roller, etc.

Even in the case where the ink circulation device 10 is disposed in order to minimize the ink mist generated upon ejection of the ink as described above, there tends to occur such a fear that the ink mist is generated owing to conditions of maintenance of the apparatus, deterioration in sensitivity of an actuator when used for a long period of time, etc. For this reason, as a mechanism for removing the ink mist, there may be disposed the mist recovery device 11.

In the ink mist by-produced upon ink-jet ejection of the ink, positive charges are collected in a central portion of the ink mist, whereas negative charges are collected in a surface layer portion of the ink mist, so that the ink mist tends to be positively charged by a Lenard effect in association with evaporation or splitting of the surface layer portion during flight of the ink mist. Therefore, the mist recovery device 11 is preferably equipped with a jig, such as a negatively charged roller, etc., in the vicinity of the ink-jet head.

As a specific example of the mist recovery device 11, there may be mentioned such a construction that at least a surface of the roller disposed on a tail side of the printer as viewed in the scanning direction of the printer (hereinafter also referred to a "tail-side roller") among the pair of rollers that come into contact with a skin or a hair, is formed of a material that is more likely to be negatively charged according to its triboelectric series. Examples of the material that is more likely to be negatively charged include polyesters, silicone rubbers and polytetrafluoroethylene (PTFE). Among these materials, preferred is PTFE. In the case where the roller formed of any of these materials is prepared and sled over a skin or a hair which tends to be positively charged, the tail-side roller is negatively charged and acts for recovering the ink mist thereon, so that it is possible to transfer the thus recovered ink mist to the skin or hair. In addition, in order to stably perform negative charging of the tail-side roller and maintain cleanness of a surface layer of the roller, a nylon or leather which tends to be positively charged is preferably used not only as an auxiliary roller for the tail-side roller, but also as a cleaning roller.

In addition, at least one of the pair of rollers which come into abutting contact with the skin or hair is preferably formed into a roller shape whose outer peripheral surface is provided with a plurality of protruded portions. As such a roller shape, preferred is a star-wheel shape. By forming the roller into a star-wheel shape, the contact area between the roller and the skin or hair can be reduced, so that it is possible to suppress peeling of a makeup image from the skin or hair owing to adhesion of the ink applied to the skin or hair onto the roller, and thereby form the predetermined high-quality makeup image on the skin or hair.

Moreover, by forming the roller into a star-wheel shape, the tip end of the respective protruded portions formed on the outer peripheral surface of the roller is likely to be electrically charged, and by selecting a material that is likely to be negatively charged according to its triboelectric series as the material of the outer peripheral surface of the roller, the mist tends to be collected at apexes of the respective protruded portions on the outer peripheral surface of the roller, so that it becomes easy to recover the ink mist. In addition, by forming the roller into the star-wheel shape, it also becomes easy to transfer the ink mixt thus collected at the apexes of the respective protruded portions to the skin or hair.

Figure 9:
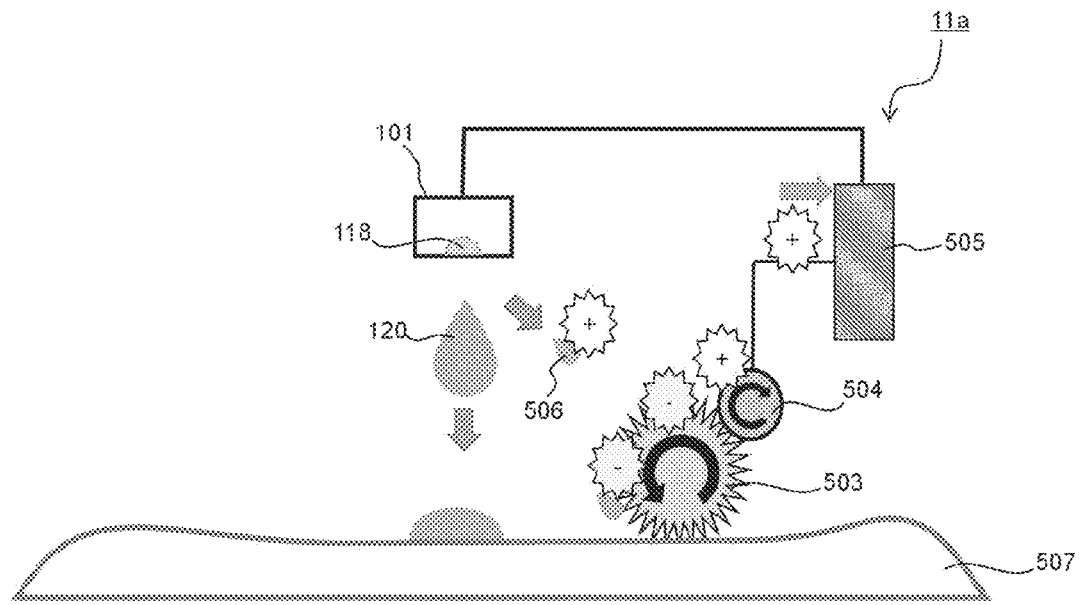
FIG. 9 is an explanatory view of a mist recovery device of the cosmetic handy ink-jet printer according to the second embodiment of the present invention.

A mist recovery device 11a as the specific example is explained by referring to FIG. 9.

At first, in order to well recover ink mist 506 generated, it is preferred that a roller 503 as the mist recovery device 11a is negatively charged. The material of the roller 503 is the same as described above. The roller 503 is negatively charged by contacting with a substrate 507, such as a skin and a hair, etc., while being rotated. To more surely negatively charge the roller 503, it is preferred that a roller 504 around which a nylon nonwoven fabric is wound comes into abutting contact with the roller 503 while being rotated. The roller 503 thus negatively charged serves for absorbing the ink mist 506 generated, and pressing the ink mist 506 thus absorbed against the substrate 507, such as a skin and a hair, etc., so that it is possible to fix the ink mist 506 thereon. In addition, by transferring positive charges stored in the roller 504 to a multi-layer ceramic chip capacitor 505, it is possible to promote negative charging of the roller 503 by conducting contact and release between the roller 503 and the roller 504 again.

The cosmetic handy ink-jet printer according to the second embodiment of the present invention is equipped with the ink circulation device and the body deelectrification device. With such a construction of the cosmetic handy ink-jet printer according to the second embodiment, it is possible to exhibit excellent ejection properties of the ink even when ejecting the ink containing the inorganic pigment by an ink-jetting method, and thereby reduce occurrence of the ink mist by-produced in association with the action of ejection of the ink.

Also, the cosmetic handy ink-jet printer according to the second embodiment of the present invention is further equipped with the mist recovery device. With such a construction of the cosmetic handy ink-jet printer according to the second embodiment, it is possible to recover the ink mist by the mist recovery device even when the ink mist is by-produced in association with the action of ejection of the ink.

Third Embodiment

The third embodiment is different from the first embodiment in that the printer of the third embodiment is further equipped with the mist recovery device 11, as shown in FIG. 8. In the following, the difference of the third embodiment from the first embodiment is explained. In addition, in the following explanation of various different embodiments, members having the same structure are designated by the same reference numeral.

<Mist Recovery Device>

The mist recovery device 11 of the cosmetic handy ink-jet printer 1 according to the third embodiment of the present invention serves for recovering the ink mist by-produced in association with the action of ejection of the ink from the ink-jet head 101 by means of a jig, such as a conductive mesh, etc.

Figure 10:
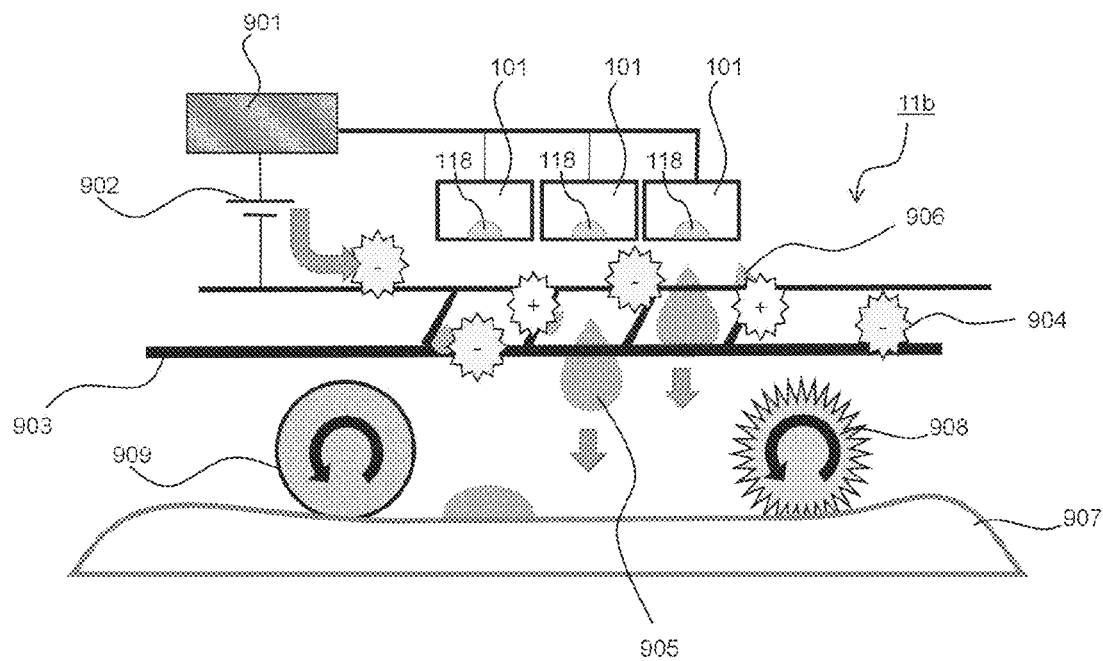
FIG. 10 is an explanatory view of a mist recovery device of the cosmetic handy ink-jet printer according to the third embodiment of the present invention.

More specifically, as shown in FIG. 10, the mist recovery device 11b is constructed of a conductive mesh 903 which is negatively charged using a capacitor 901, such as a multi-layer ceramic chip capacitor, etc., and a battery 902.

In the mist recovery device 11b, in the case where the ink is ejected from the ink-jet head 101, the ink droplet 905 as a main droplet upon ejection of the ink is passed through openings of the conductive mesh 903 and reaches a substrate 907, such as a skin and a hair, etc., which is maintained in a pseudo flat surface shape by a roller 908 and a roller 909. On the other hand, positively charged ink mist 906 is attracted to negative charges 904 of the conductive mesh 903 and captured by the conductive mesh 903.

The cosmetic handy ink-jet printer according to the third embodiment of the present invention is equipped with the ink circulation device and the body deelectrification device and further equipped with the mist recovery device. With such a construction of the cosmetic handy ink-jet printer according to the third embodiment, it is possible to recover the ink mist by the mist recovery device even when the ink mist is by-produced in association with the action of ejection of the ink.

Fourth Embodiment

Figure 11:
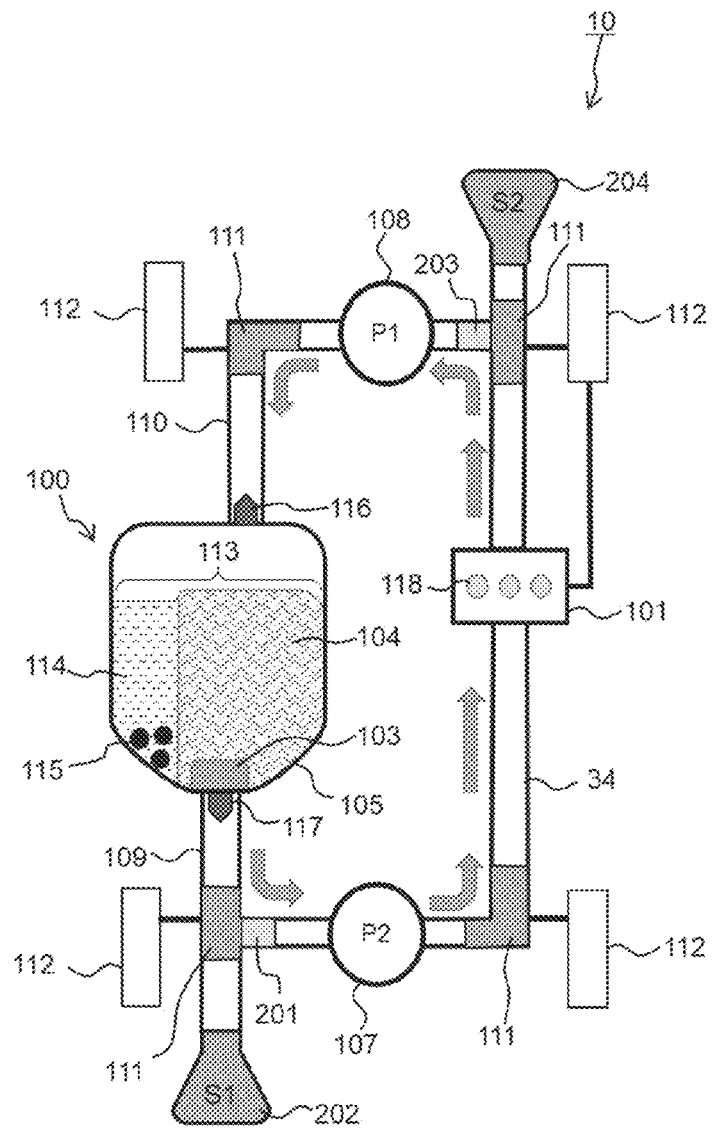
FIG. 11 is a schematic view of a construction including an ink receptacle and an ink circulation path which are adapted to a cosmetic handy ink-jet printer according to a fourth embodiment of the present invention.

The fourth embodiment is different from the first embodiment in that the ink circulation device 10 is further equipped, as a trap, with at least one member selected from the group consisting of a filter 201, a filter 203, a surplus space 202 and a surplus space 204, as shown in FIG. 11. In FIG. 11, the surplus space 202 and the surplus space 204 are represented by S1 (Space 1) and S2 (Space 2), respectively. In the following, the difference of the fourth embodiment from the first embodiment is explained. In addition, in the following explanation of various different embodiments, members having the same structure are designated by the same reference numeral.

<Trap>

In the cosmetic handy ink-jet printer 1 according to the fourth embodiment, the ink circulation device 10 is preferably equipped with at least one member selected from the group consisting of the filter 201, the filter 203, the surplus space 202 and the surplus space 204 as a trap capable of capturing at least one material of coarse particles of the inorganic pigment and air bubbles.

The filter 201 is disposed in the ink circulation path 34 to collect coarse particles of the inorganic pigment which tend to be mixed or generated in the flow path, in particular, tend to be precipitated therein, during circulation of the ink, and to precipitate and capture the coarse particles in the surplus space 202 upon stop of the circulation. The pore size of the filter 201 is preferably not less than 5 μm, more preferably not less than 7 μm and even more preferably not less than 6 μm, and is also preferably not more than 20 μm, more preferably not more than 18 μm and even more preferably not more than 16 μm.

The filter 203 is disposed in the ink circulation path 34 to collect air bubbles that are mixed in the flow path or entered from the nozzles 118, and to allow the air bubbles to ascend up to the surplus space 204 upon stop of the circulation for capturing the air bubbles therein. The pore size of the filter 203 is preferably not less than 20 μm, more preferably not less than 22 μm and even more preferably not less than 24 μm, and is also preferably not more than 50 μm, more preferably not more than 45 μm and even more preferably not more than 40 μm.

The surplus space 202 is preferably disposed in a part of the ink circulation path 34, in particular, in the vicinity of a terminal end of the vertically downward flow path. The surplus space 202 disposed at the lower end of the flow path is capable of efficiently capturing the inorganic pigment precipitated, in particular, efficiently capturing coarse particles of the inorganic pigment which are more likely to be precipitated. Accordingly, by disposing the surplus space 202, it is possible to remove, in particular, the coarse particles of the inorganic pigment which tend to be precipitated in the other flow paths or head nozzles by preliminarily precipitating these particles in the surplus space 202.

In the case where the inorganic pigment captured in the surplus space 202 is dispersed with an ionic group-containing polymer, the ink present in the proximity of the surplus space 202 is enhanced in concentration of a neutralized salt therein and therefore increased in osmotic pressure thereof. For this reason, the inorganic pigment can be prevented to be excessively precipitated, so that it is possible to suppress clogging of the flow path itself by the precipitated inorganic pigment.

The surplus space 204 is preferably disposed in a part of the ink circulation path 34, in particular, in the vicinity of a terminal end of the vertically upward flow path. The surplus space 202 disposed at the upper end of the flow path is capable of efficiently capturing a gaseous substance, such as air, etc., which is mixed in the ink 113 in the flow path. Accordingly, since the surplus space 204 is capable of efficiently capturing air bubbles, etc., which are generated upon circulating the ink 113 in the flow path, it is possible to efficiently remove the gaseous substance, such as air, etc., which may cause enhancement of a flow resistance in the flow path, from the ink 113 circulated.

The surplus spaces 202 and 204 may be respectively dismounted from the ink circulation path 34 under such a condition that the respective spaces are disconnected to the ink circulation path 34. Alternatively, the contents of the respective surplus spaces 202 and 204 may be pushed out or withdrawn therefrom without disconnecting them from the ink circulation path 34. The material of the respective surplus spaces 202 and 204 is preferably a rubber-like deformable material. From the viewpoint of allowing these surplus spaces to elastically close a small aperture formed therethrough, e.g., even when penetrating them by an injection needle, etc., the material of the respective surplus spaces 202 and 204 is preferably a rubberlike material, and from the viewpoint of attaining a good chemical resistance thereof, more preferably a silicone rubber.

The cosmetic handy ink-jet printer according to the fourth embodiment of the present invention is equipped with the ink circulation device and the body deelectrification device, and further equipped with the trap. With such a construction of the fourth embodiment, it is possible to efficiently capture coarse particles of the inorganic pigment and air (bubbles) in the ink, so that the ink can be improved in ejection properties, and the amount of the ink mist generated can be reduced to a large extent.

Modification of Fourth Embodiment

Figure 12:
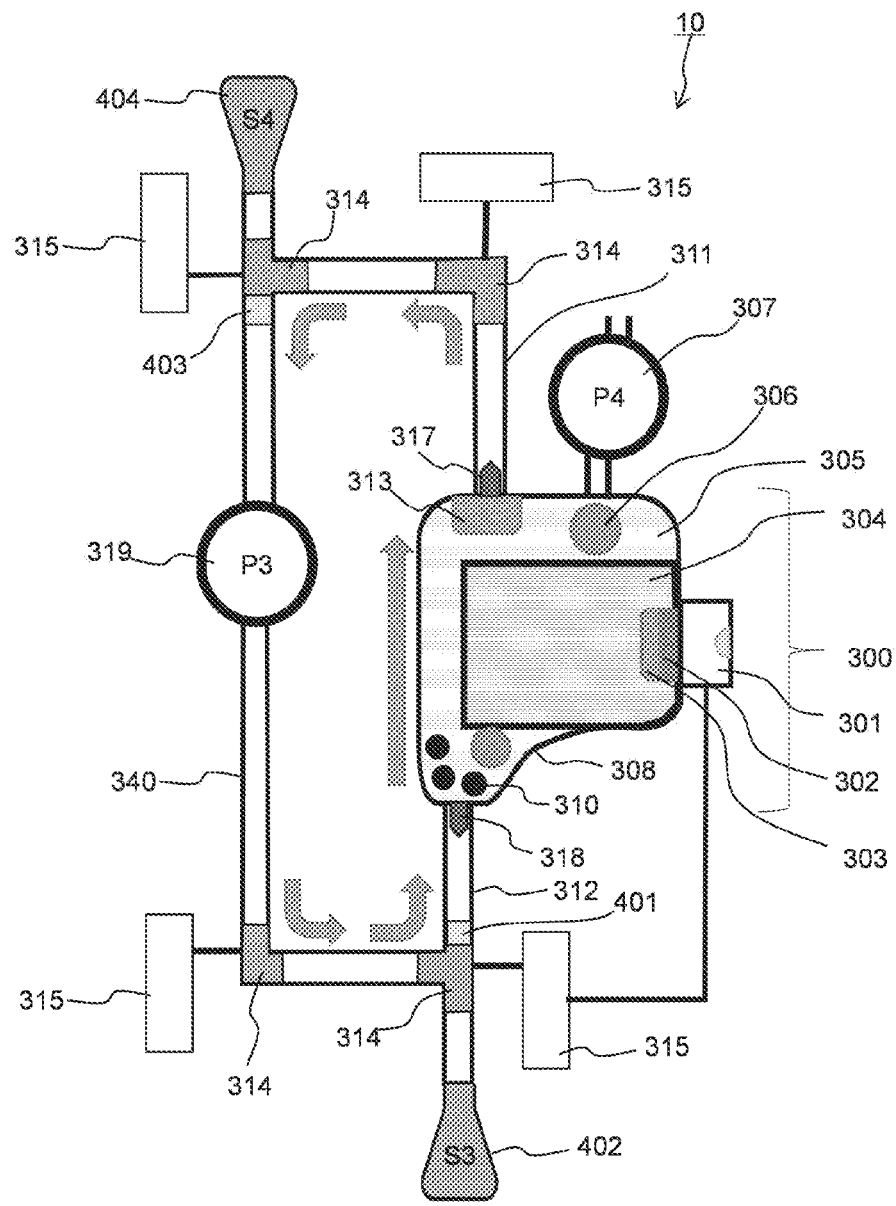
FIG. 12 is a schematic view of a construction including an ink receptacle and an ink circulation path which are adapted to a cosmetic handy ink-jet printer according to a modification of the fourth embodiment of the present invention.

In the cosmetic handy ink-jet printer according to a modification of the fourth embodiment of the present invention, as shown in FIG. 12, the ink circulation device 10 in which the ink receptacle 300 and the ink-jet head 301 are integrated with each other is preferably equipped with at least one member selected from the group consisting of a filter 401, a filter 403, a surplus space 402 and a surplus space 404 as a trap capable of capturing at least one material of coarse particles of the inorganic pigment and air bubbles. In FIG. 12, the surplus space 402 and the surplus space 404 are represented by S3 (Space 3) and S4 (Space 4), respectively.

The filter 401 is disposed to capture coarse particles of the inorganic pigment which tend to be mixed or produced in the flow path and, in particular, tend to be precipitated therein, during circulation of the ink, and to precipitate and capture the coarse particles in the surplus space 402 upon stop of the circulation. The pore size of the filter 401 preferably lies within the same range as that of the aforementioned filter 201.

The filter 403 is disposed to collect air bubbles that are mixed in the flow path or entered from the nozzles 118, during circulation of the ink, and to allow the air bubbles to ascend up to the surplus space 404 upon stop of the circulation for capturing the air bubbles therein. The pore size of the filter 403 preferably lies within the same range as that of the aforementioned filter 203.

The surplus space 402 is preferably disposed in a part of the flow path, in particular, in the vicinity of a terminal end of the vertically downward flow path. The surplus space 402 disposed at the lower end of the flow path is capable of efficiently capturing the inorganic pigment precipitated, in particular, efficiently capturing coarse particles of the inorganic pigment which are more likely to be precipitated. Accordingly, by disposing the surplus space 402, it is possible to remove, in particular, the coarse particles of the inorganic pigment which tend to be precipitated in the other flow paths or head nozzles by preliminarily precipitating these particles in the surplus space 402.

In the case where the inorganic pigment captured in the surplus space 402 is dispersed with an ionic group-containing polymer, the ink present in the proximity of the surplus space 402 is enhanced in concentration of a neutralized salt therein and therefore increased in osmotic pressure thereof. For this reason, the inorganic pigment can be prevented to be excessively precipitated, so that it is possible to suppress clogging of the flow path itself by the precipitated inorganic pigment.

The surplus space 404 is preferably disposed in a part of the flow path, in particular, in the vicinity of a terminal end of the vertically upward flow path. The surplus space 402 disposed at the upper end of the flow path is capable of efficiently capturing a gaseous substance, such as air, etc., which is mixed in the ink in the flow path. Accordingly, since the surplus space 404 is capable of efficiently capturing air bubbles, etc., which are generated upon circulating the ink in the flow path, it is possible to efficiently remove the gaseous substance, such as air, etc., which may cause enhancement of a flow resistance in the flow path, from the ink circulated.

The surplus spaces 402 and 404 may be respectively dismounted under such a condition that the respective spaces are disconnected to an ink circulation path 34. Alternatively, the contents of the respective surplus spaces 402 and 404 may be pushed out or withdrawn therefrom without disconnecting them from the ink circulation path. The material of the respective surplus spaces 402 and 404 is preferably the same as that of the aforementioned respective surplus spaces 202 and 204.

Fifth Embodiment

Figure 13:
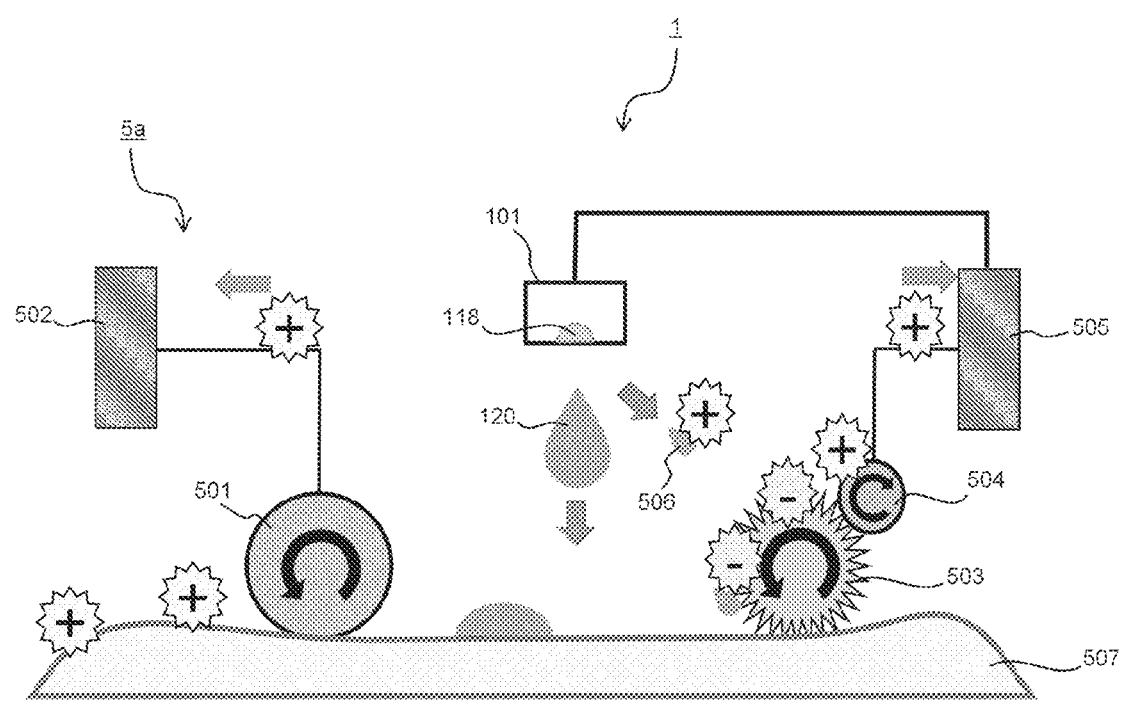
FIG. 13 is an explanatory view of a substrate deelectrification device of a cosmetic handy ink-jet printer according to a fifth embodiment of the present invention.

The fifth embodiment is different from the first embodiment in that the printer of the fifth embodiment is further equipped with a substrate deelectrification device 5a which serves for deelectrifying a substrate to be printed before printing, as shown in FIG. 13. In the following, the difference of the fifth embodiment from the first embodiment is explained. In addition, in the following explanation of various different embodiments, members having the same structure are designated by the same reference numeral.

<Substrate Deelectrification Device>

In the cosmetic handy ink-jet printer 1 according to the fifth embodiment of the present invention, as shown in FIG. 13, the substrate deelectrification device 5a is equipped with a conductive roller 501 having electrical conductivity, and a deelectrification section 502 which is connected to the conductive roller 501.

Even in the case where the printer can be designed so as to minimize the ink mist generated upon ejection of the ink to thereby enable formation of normal droplets of the ink similarly to the cosmetic handy ink-jet printer 1 according to the first embodiment, the ink droplets 120 tend to be positively charged by a Lenard effect as described previously. On the other hand, a substrate 507, such as a skin and a hair, etc., is also likely to be positively charged in view of its triboelectric series, so that the positive charges on the ink droplets 120 and the positive charges on the substrate 507 tend to be repelled against each other. As a result, there tend to occur the case in which the devices, such as the nozzles 118, etc., are contaminated, and the ink is deteriorated in ejection properties, so that the ink mist 506 is by-produced.

In these circumstances, the substrate deelectrification device 5a is provided as a device for eliminating electrification charges on the substrate 507, such as a skin and a hair, etc., before printing, in which the conductive roller 501 having electrical conductivity is allowed to slidingly move over the substrate 507, such as a skin and a hair, etc., before printing, so that it is possible to eliminate positive charges therefrom through the conductive roller 501. More specifically, in the case where the conductive roller 501 comes into contact with the substrate 507, such as a skin and a hair, etc., electrification charges on the substrate 507 are transferred to the conductive roller 501, and most of the electrification charges transferred to the conductive roller 501 are further rapidly transferred to the deelectrification section 502 where the electrification charges can be eliminated. That is, it is possible to maintain the substrate 507, such as a skin and a hair, etc., immediately before printing in an electrically neutral state by allowing the conductive roller 501 having electrical conductivity to slidingly move thereover. Accordingly, by providing the substrate deelectrification device 5a, the electrification charges of the substrate 507 are rapidly eliminated, so that the ink mist 506 if it is generated hardly undergoes repulsion against the substrate 507, such as a skin and a hair, etc., and is allowed to impact on the substrate 507 similarly to the ink droplets 120.

The material of the conductive roller 501 is not particularly limited as long as it has electrical conductivity. Examples of the material of the conductive roller 501 include copper, stainless steel and a conductive resin.

The deelectrification section 502 is not particularly limited as long as it has a deelectrifying function. Examples of the deelectrification section 502 include capacitors and grounded circuits. Among the capacitors, preferred is a multi-layer ceramic chip capacitor that is capable of storing static electricity and dispersing electrical charges.

The cosmetic handy ink-jet printer according to the fifth embodiment of the present invention is equipped with the ink circulation device and the body deelectrification device and further equipped with the substrate deelectrification device 5a. With such a construction of the cosmetic handy ink-jet printer according to the fifth embodiment, it is possible to efficiently eliminate electrification charges of the substrate before printing, so that the amount of the ink mist generated can be reduced to a large extent.

Sixth Embodiment

Figure 14:
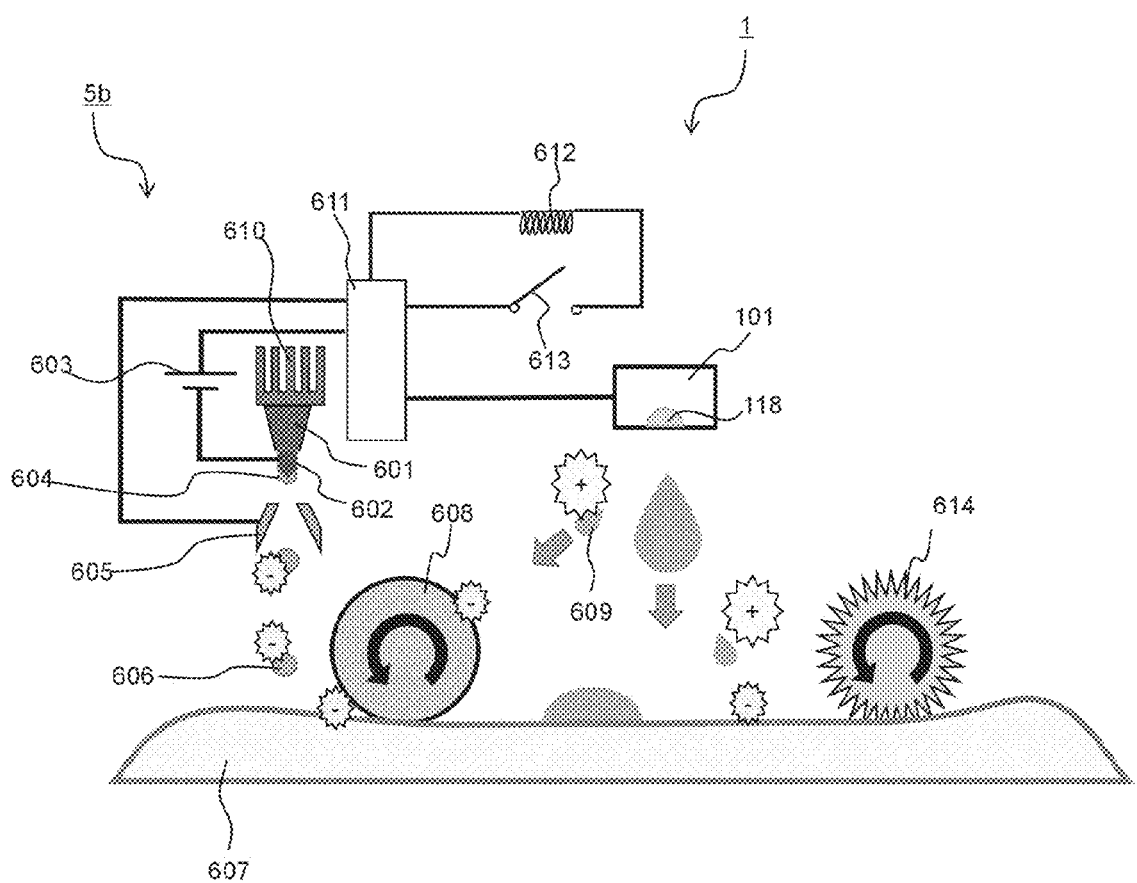
FIG. 14 is an explanatory view of a substrate deelectrification device of a cosmetic handy ink-jet printer according to a sixth embodiment of the present invention.

The sixth embodiment is different from the first embodiment in that the printer of the sixth embodiment is further equipped with a substrate deelectrification device 5b which serves for deelectrifying a substrate to be printed before printing, as shown in FIG. 14. In the following, the difference of the sixth embodiment from the first embodiment is explained. In addition, in the following explanation of various different embodiments, members having the same structure are designated by the same reference numeral.

<Substrate Deelectrification Device>

In the cosmetic handy ink-jet printer 1 according to the sixth embodiment of the present invention, as shown in FIG. 14, the substrate deelectrification device 5b serves for applying negatively charged water fine particles 606 to the substrate 607 before printing.

The substrate deelectrification device 5b is not particularly limited as long as it is capable of spraying negatively charged aqueous fine particles. For example, there may be used a device that is capable of producing the negatively charged water fine particles 606 by subjecting water fine particles produced using an ultrasonic atomizer, etc., to corona discharge treatment, etc.

In the substrate deelectrification device 5b, a voltage of −5 kV is first applied to a terminal electrode 602 cooled by a Peltier element 601 from a power supply 603. Water vapor or droplets 604 present in the air are condensed on the terminal electrode 602 thus cooled, and negatively charged by the terminal electrode 602 to form a conical structure called a Taylor cone from an end portion of which the charged water fine particles 606 fly towards an earth electrode 605. Then, the charged water fine particles 606 are allowed to pass through a gap in the earth electrode 605, and reach the substrate 607 to apply negative charges to the substrate 607. The thus applied negative charges are stored as an electrical potential on a surface layer of a conductive roller 608, so that the ink mist with positive charges which is generated from the ink-jet head 101 is sucked and adhered to the negative charges on the conductive roller 608. The ink mist 609 adhered is transferred through the conductive roller 608 to the substrate 607 that is maintained in a pseudo flat shape by the roller 608 and a roller 614. Thus, the ink mist 609 is recovered on the substrate 607. In addition, a surface of the Peltier element 601 which is opposed to its cooled surface is heated, and therefore allowed to come into abutting contact with a heat radiator plate 610 to thereby cool the Peltier element 601.

When spraying the charged water fine particles 606, the hand-held unit 3 of the cosmetic handy ink-jet printer 1 is not connected to earth. Therefore, the terminal electrode 602 and the earth electrode 605 are connected to a capacitor 611, such as a multi-layer ceramic chip capacitor, etc., instead of the earth.

The electrical charges stored in the capacitor 611 at the time at which the charged water fine particles are produced, are discharged through a discharge circuit including a resistance 612 and a switch 613.

The cosmetic handy ink-jet printer according to the sixth embodiment of the present invention is equipped with the ink circulation device and the body deelectrification device, and further equipped with the substrate deelectrification device 5b. With such a construction of the cosmetic handy ink-jet printer according to the sixth embodiment, it is possible to efficiently eliminate electrification charges of the substrate before printing, so that the amount of the ink mist generated can be reduced to a large extent.

Seventh Embodiment

Figure 15:
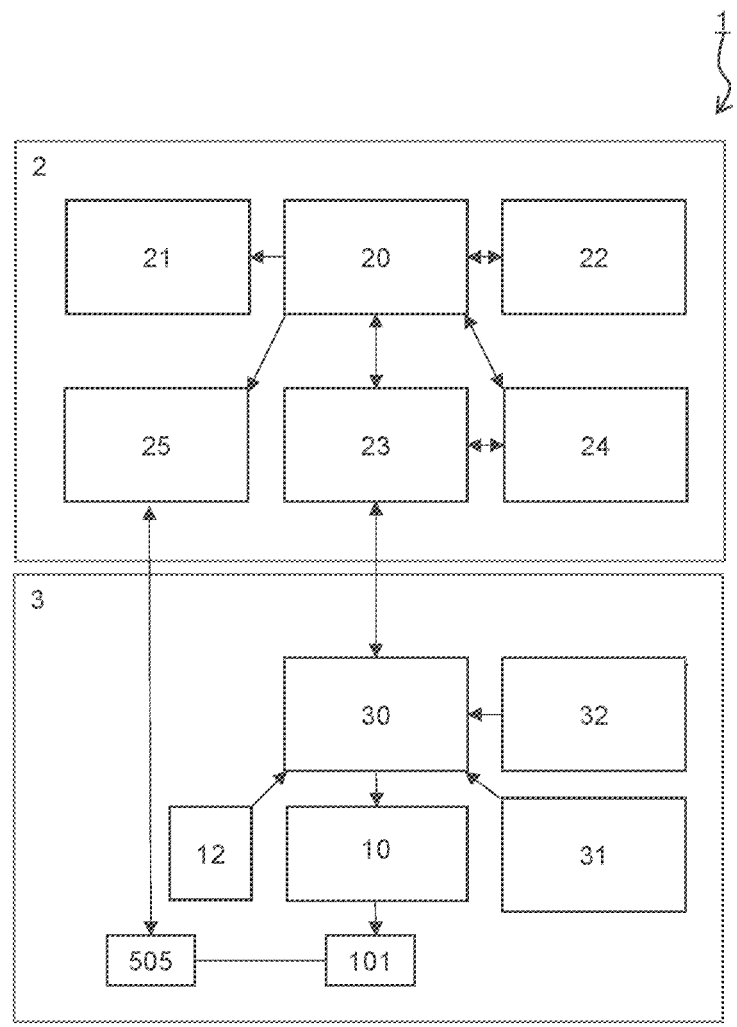
FIG. 15 is a block diagram showing a construction of a cosmetic handy ink-jet printer according to a seventh embodiment of the present invention.

The seventh embodiment is different from the first embodiment in that the printer of the seventh embodiment is further equipped with a mist detection device 12, as shown in FIG. 15. In the following, the difference of the seventh embodiment from the first embodiment is explained. In addition, in the following explanation of various different embodiments, members having the same structure are designated by the same reference numeral.

<Mist Detection Device>

The mist detection device 12 of the cosmetic handy ink-jet printer 1 according to the seventh embodiment serves for detecting the ink mist by-produced in association with the action of ejection of the ink from the ink-jet head 101.

Even in the case where the ink circulation device 10 is provided in order to minimize the ink mist generated upon ejection of the ink, there tends to occur such a fear that the ink mist is generated owing to conditions of maintenance of the apparatus or deterioration in sensitivity of an actuator when used for a long period of time, etc. For this reason, with the provision of the mist detection device 12, in the case where occurrence of the ink mist can be inhibited to a sufficient extent, the use of the cosmetic handy ink-jet printer 1 is stopped to prompt the user to conduct an adequate maintenance, whereby it is possible to inhibit the user from taking the risk of erroneously aspirating the ink mist. In addition, in the case where stable ejection of the ink can be maintained so that occurrence of the ink mist can be sufficiently prevented, the mist detection device 12 is operated to stop unnecessary functions of the mist recovery device, etc., disposed in the cosmetic handy ink-jet printer 1, whereby it is possible to suppress power consumption of a battery or wearing of the apparatus.

Figure 16:
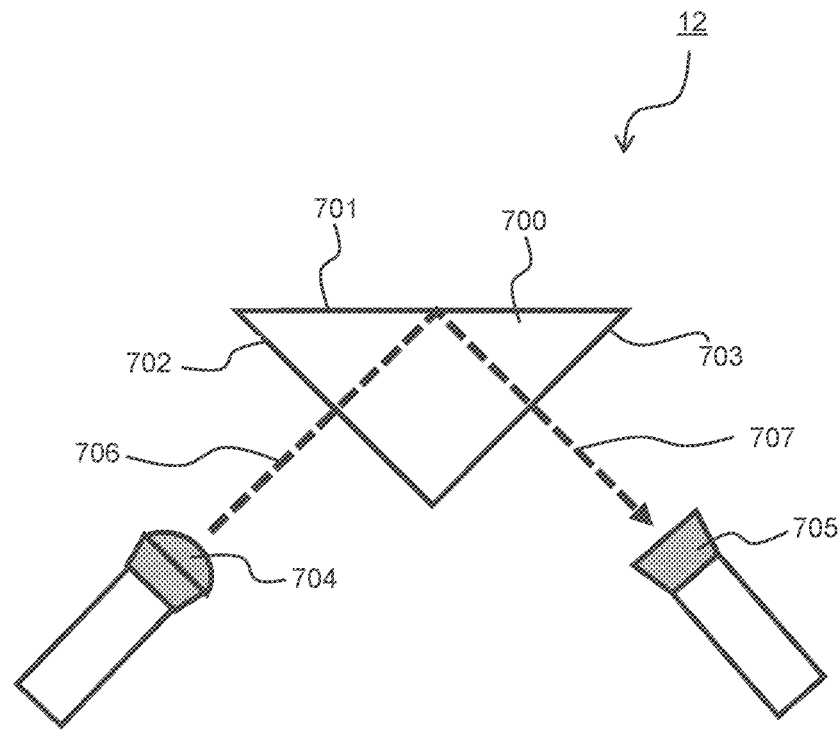
FIG. 16 is an explanatory view of a construction of a mist detection device of the cosmetic handy ink-jet printer according to the seventh embodiment of the present invention.

As shown in FIG. 16, the mist detection device 12 is equipped with a transparent member 700, a light source 704 and a light receiving section 705.

The mist detection device 12 is not required to measure a particle size distribution of the ink mist generated. In the mist detection device 12, it suffices that a laser light, etc., emitted from the light source 704 is allowed to impinge on the mist adherend so as to detect occurrence of scattering of the light thereon. Therefore, in the mist detection device 12, there may be used a detector and a detection circuit which have a simplified construction.

The transparent member 700 is a right angle prism having a mist adhesion surface 701, a first inclined surface 702 and a second inclined surface 703. The side surface of the transparent member 700 is defined by the mist adhesion surface 701, the first inclined surface 702 and the second inclined surface 703, and has an isosceles right triangular shape.

The first inclined surface 702 has an inclined angle of 45° relative to the mist adhesion surface 701. The first inclined surface 702 is a light-permeable surface through which incident light 706 emitted from the light source 704 towards the transparent member 700 enters into the transparent member 700. The second inclined surface 703 has an inclined angle of 45° relative to the mist adhesion surface 701. The first inclined surface 702 and the second inclined surface 703 make an angle of 90° to each other.

The second inclined surface 703 is a light-permeable surface through which reflected light 707 that is formed by totally reflecting the incident light entering through the first inclined surface 702 into the transparent member 700, on the mist adhesion surface 701, is emitted from the transparent member 700 outside.

In the light source 704, as a light-emitting member, there may be used, for example, a white LED and a semiconductor laser.

The light receiving section 705 is a device for receiving the reflected light 707 that is formed by totally reflecting the incident light on the mist adhesion surface 701 of the transparent member 700 to detect an amount of the light received. As the light receiving section 705, there may be used, for example, a photodiode and a phototransistor.

The transparent member 700 is preferably formed of a material that is likely to be positively charged according to its triboelectric series from the viewpoint of easily positively charging the ink mist. This is because if the transparent member 700 is formed of a resin that is likely to be negatively charged, etc., the ink mist that should be inherently recovered by the mist recovery device is captured by the transparent member 700, so that an excessive amount of the ink mist is erroneously detected by the mist detection device. On the other hand, if the transparent member 700 is formed of a material that is likely to be positively charged, it is possible to suppress adsorption of the positively charged ink mixt thereonto, and therefore adequately detect the ink mist.

Examples of the material of the transparent member which is likely to be positively charged include glass and quartz. In the case where the glass or quartz is used as the material of the transparent member 700, even when the glass or quartz is contaminated upon use, the automatic calibration of detection of the ink mist can be conducted under the contaminated condition to detect the tendency of change of contamination of the glass or quartz from the presently contaminated condition to the further contaminated condition, whereby it is possible to detect occurrence of the ink mist. The detection of the occurrence of the ink mist can be achieved by comparing the amount of light at initiation of use of the device with the amount of light during the use of the device, whereby it is possible to adapt properly to deterioration in performance of the light source or battery owing to degradation of the device with time, so that the life of the device can be substantially prolonged.

Figure 17:
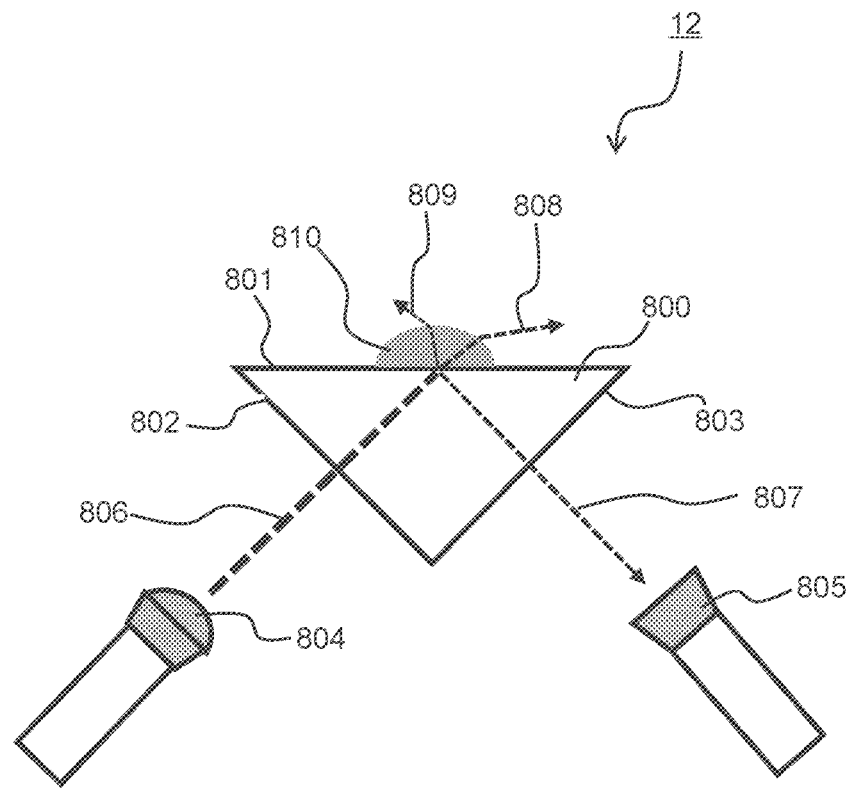
FIG. 17 is an explanatory view of a method for detecting mist using the mist detection device of the cosmetic handy ink-jet printer according to the seventh embodiment of the present invention.

The case in which ink mist 810 is adhered to the mist detection device 12 is explained by referring to FIG. 17. A transparent member 800 is a right angle prism having a mist adhesion surface 801, a first inclined surface 802 and a second inclined surface 803.

At first, in the mist detection device 12, the transparent member 800 is disposed in an atmosphere in the vicinity of the nozzles of the ink-jet head where the ink mist tends to be floated. In the transparent member 800, light emitted from a light source 804 is irradiated to the mist adhesion surface 801 through the first inclined surface 802. In the case where no ink mist 810 is adhered to the mist adhesion surface 801, incident light 806 reaches an interface between the transparent member 800 and the air and is reflected thereon as reflected light 807, and then the reflected light 807 is allowed to enter into a light receiving section 805. On the other hand, in the case where the ink mist is adhered to the mist adhesion surface 801, the incident light 806 is scattered by the ink mist 810 adhered, so that the amount of light detected by the light receiving section 805 is changed from that before the ink mist is adhered thereto. The ink mist adhered can be detected by the change in the measured amount of light.

More specifically, in the case where the material of the transparent member of the mist detection device 12 is quartz, and the ink mist 810 containing an inorganic pigment, such as titanium oxide, etc., is adhered onto the mist adhesion surface 801, the quartz and the titanium oxide cooperate to form an optical continuous layer, so that the interface to the air is not the quartz, but the titanium oxide particles contained in the ink mist 810. In this case, a whole amount of the incident light 806 does not undergo total reflection on the interface between the quartz and the air, but a part of the incident light 806 is subjected to refraction, scattering and reflection on the interface between the titanium oxide and the air. However, since the titanium oxide particles are not in the form of a homogeneous crystal, a large amount of the light irradiated to the interface between the titanium oxide and the air is converted into scattering light rays 808 and 809. As a result, the intensity of the reflected light 807 entering into the light receiving section 805 is reduced, whereby it is possible to detect adhesion of the ink mist 810 to the device.

The mist detection device 12 is preferably further equipped with a light-scattering type particle detection device (not shown) using a laser light as a light source. With the provision of the particle detection device, particles of the inorganic pigment, etc., which are contained in the ink mist adhered to the mist adhesion surface can be detected, so that it is possible to well control the condition of occurrence of the ink mist with good accuracy.

In addition, the mist detection device 12 is preferably further equipped with an optical filter (not shown) which interrupts permeation of directly reflected light, but allows only scattering light to pass therethrough. With the provision of the optical filter, it is possible to enhance a light-receiving sensitivity of the light receiving section, and it becomes easy to control the condition of occurrence of the ink mist.

Other Embodiments

In the aforementioned description, as the cosmetic handy ink-jet printer 1, there are shown those printers according to the first to seventh embodiments. However, the first embodiment may be appropriately combined with any of the second through seventh embodiments, i.e., any two or more of these embodiments described above may be appropriately combined with each other, and all of the aforementioned embodiments may be combined with each other.

EXAMPLES

The present invention will be described in more detail by the following Examples, etc., but it is not intended to limit the scope of the invention thereto.

Properties of polymers used in an ink containing an inorganic pigment, as well as properties of the ink, etc., were measured by the following methods.

[Number-Average Molecular Weight of Poly(N-Propionyl Ethyleneimine)]

The number-average molecular weight of poly(N-propionyl ethyleneimine) was measured by gel permeation chromatography [measuring columns: two columns "K-804L" available from SHOWA DENKO K.K., connected in series to each other; flow rate: 1 mL/min; column temperature: 40° C.; detector: differential refractometer] using a 1 mmol/L solution of "FARMIN DM20" (tradename) available from Kao Corporation in chloroform as an eluent, and using polystyrenes having previously known molecular weights as a reference standard substance. The sample to be measured was used in an amount of 100 μL at a concentration of 5 mg/mL.

[Volume-Average Particle Sizes of Particles of Colorants Other than Inorganic Pigment]

Using the following measuring apparatus, the volume-average particle sizes of particles of colorants other than the inorganic pigment were measured under the following conditions.

Measuring Apparatus: Zeta potential/particle size measuring system "ELS-8000" commercially available from Otsuka Electrics Co., Ltd.

Measuring Conditions: Cumulant Analysis

The dispersion containing the particles to be measured was diluted with water so as to adjust a concentration of the particles therein to about $5 \times 10^{-3}$% by mass, and the resulting dilute dispersion liquid was filled in a cell for measurement. The measurement was conducted at a temperature of 25° C. and a cumulative number of 100 times, and a refractive index of water (1.333) was input to the measuring system as a refractive index of the dispersing solvent.

[Volume-Average Particle Size of Particles of Inorganic Pigment (Titanium Oxide Pigment Particles)]

Using a laser diffraction/scattering particle size distribution measuring apparatus "LA950" available from HORIBA Ltd., under the condition that a refractive index of the inorganic pigment and a refractive index of water were set to the predetermined value (in the case of titanium oxide, set to 2.75) and 1.333, respectively, and further scales of a circulating rate and an ultrasonic wave of the apparatus were set at "5" and "3", respectively, a dispersion of the inorganic pigment was irradiated with an ultrasonic wave for 1 minute, followed by measuring particle sizes of the inorganic pigment particles in the dispersion. At this time, the value of the thus measured volume median particle size ($D_{50}$) was determined as a volume-average particle size of the inorganic pigment particles (titanium oxide pigment particles).

[Solid Content]

Using an infrared moisture meter "FD-230" available from Kett Electric Laboratory, 5 g of a sample to be measured was dried at a drying temperature of 150° C. under a measuring mode 96 (monitoring time: 2.5 minutes/variation range: 0.05%) to measure a water content (% by mass) of the sample to be measured. The solid content of the sample was calculated according to the following formula.

Solid Content (% by mass)=100−Water Content (% by mass) of Sample to be Measured

[Static Surface Tension of Ink]

A platinum plate was dipped in 5 g of a sample adjusted to 20° C. which was filled in a cylindrical polyethylene container (3.6 cm in diameter×1.2 cm in depth), and the static surface tension of the sample was measured at 20° C. using a surface tension meter "CBVP-Z" available from Kyowa Interface Science Co., Ltd., by a Wilhelmy method.

[Viscosity of Ink]

The viscosity of the ink was measured at 35° C. using an E-type viscometer "TV-25" (equipped with a standard cone rotor (1° 34'×R24); rotating speed: 50 rpm) available from Toki Sangyo Co., Ltd.

<Production of Ink Containing Inorganic Pigment>

Synthesis Example 1 (Synthesis of Cationic Silicone Polymer 1)

A mixed solution prepared by mixing 73.7 g (0.74 mol) of 2-ethyl-2-oxazoline and 156.0 g of ethyl acetate was dehydrated with 12.0 g of a molecular sieve "ZEOLUM A-4" available from Tosoh Corporation at 28° C. for 15 hours. The resulting dehydrated ethyl acetate solution of 2-ethyl-2-oxazoline was mixed with 2.16 g (0.014 mol) of diethyl sulfate, and the obtained mixture was refluxed under heating at 80° C. in a nitrogen atmosphere for 8 hours, thereby obtaining a solution of terminal-reactive poly(N-propionyl ethyleneimine) (number-average molecular weight: 6,000). Separately, a mixed solution prepared by mixing 70.0 g of a side-chain primary aminopropyl-modified poly(dimethyl siloxane) "KF-864" (weight-average molecular weight: 50,000 (catalogue value); amine equivalent: 3,800) available from Shin-Etsu Chemical Co., Ltd., and 140.0 g of ethyl acetate with each other was dehydrated with 15.0 g of the molecular sieve at 28° C. for 15 hours.

Next, the terminal-reactive poly(N-propionyl ethyleneimine) solution obtained above was added to the aforementioned dehydrated side-chain primary aminopropyl-modified poly(dimethyl siloxane) solution at one time, followed by refluxing the obtained mixed solution under heating at 80° C. for 10 hours. The resulting reaction mixture was concentrated under reduced pressure to obtain a poly(N-propionyl ethyleneimine)/dimethyl polysiloxane copolymer (hereinafter also referred to as a "cationic silicone polymer 1") in the form of a white rubber-like solid (135 g). The mass ratio of a content of an organopolysiloxane segment (x) to a total content of the organopolysiloxane segment (x) and a poly(N-acyl alkylene imine) segment (y) [content of organopolysiloxane segment (x)/total content of organopolysiloxane segment (x) and poly(N-acyl alkylene imine) segment (y)] in the polymer was 0.50, and the weight-average molecular weight of the cationic silicone polymer 1 was 100,000 (calculated value). The resulting cationic silicone polymer 1 was mixed with first-grade ethanol, thereby obtaining a solution of the cationic silicone polymer 1 (solid content: 30% by mass).

Production Examples 1-1 to 1-5 (Production of Non-White Colorant Water Dispersion)

(Step I: Production of Colorant Dispersion Liquid)

A sealable and temperature-controllable glass jacket was charged with 200 g of a solution of an anionic acrylic polymer "PLUS SIZE L-9909B" (acid value: 50 mgKOH/g; unneutralized product; an ethanol solution having a solid content of 40% by mass) as a water-dispersive polymer available from GOO Chemical Co., Ltd. While stirring the solution under the conditions including a jacket temperature of 15° C. and a rotating speed of 1,400 rpm using a high-speed disperser "T.K. ROBOMIX" (equipped with "HOMODISPER 2.5 Model" as a stirring device (blade diameter: 40 mm)) available from Primix Corporation, 200 g of the colorant shown in Table 1 was added thereto, and the resulting mixture was further stirred under the conditions including a jacket temperature of 15° C. and a rotating speed of 2,000 rpm for 1 hour to render the colorant compatible with the anionic acrylic polymer solution.

Next, while maintaining the jacket temperature of 15° C., the rotating speed of the disperser was changed to 8,000 rpm at which 170 g of the first grade ethanol, 17.1 g of a 5N NaOH aqueous solution and 412.9 g of ion-exchanged water were charged into the jacket, and the contents of the jacket were stirred for 3 hours, thereby obtaining a colorant mixture (concentration of ethanol in medium: 40.4% by mass; solid content: 28% by mass).

The thus obtained colorant mixture was subjected to dispersion treatment by passing the mixture through a Microfluidizer "Model: M-140K" available from Microfluidics Corporation under a pressure of 180 MPa 20 times, followed by adding 900 g of ion-exchanged water thereto, thereby obtaining respective colorant dispersion liquids each having a solid content of 14.7% by mass.

The thus obtained colorant dispersion liquids were respectively subjected to measurement for a volume-average particle size of colorant particles contained therein. The volume-average particle sizes of the colorant particles in the respective colorant dispersion liquids are shown in Table 1.

(Step II: Removal of Organic Solvent)

Using a reduced-pressure distillation apparatus (rotary evaporator) "N-1000S Model" available from Tokyo Rikakikai Co., Ltd., the resulting colorant dispersion liquids were respectively maintained in a warm bath adjusted to 40° C. under a pressure of 10 kPa for 2 hours to remove the organic solvent therefrom. The resulting dispersion was further maintained in the warm bath adjusted to 62° C. under the pressure reduced to 7 kPa for 4 hours to remove the organic solvent and a part of water therefrom such that a total concentration of the colorant and the water-dispersive polymer in the dispersion (solid content) was controlled to the range of from 23 to 25% by mass. Then, while measuring the total concentration of the colorant and the water-dispersive polymer (solid content), ion-exchanged water was added to the dispersion so as to control the total concentration of the colorant and the water-dispersive polymer therein to 20% by mass.

Next, the thus obtained respective dispersions were subjected to filtration treatment by passing through 5 μm-mesh and 1.2 μm-mesh membrane filters "Minisart" available from Sartorius Inc., in sequential order, thereby obtaining respective colorant water dispersions.

The volume-average particle sizes of the colorant particles in the resulting respective colorant water dispersions are shown in Table 1.

The details of the colorants shown in Table 1 are as follows.

Yellow No. 5: Yellow pigment "Sun CROMA FD & C Yellow 6 Al Lake" (C.I. Pigment Yellow 104) available from Sun Chemical Corporation.

Yellow No. 4: Yellow pigment "BC Yellow No. 4 AL" (C.I. Pigment Yellow 100) available from Kishi Kasei Co., Ltd.

Blue No. 1: Blue pigment "Sun CROMA FD & C Blue 1 Al Lake" (C.I. Food Blue 2 Aluminum Lake) available from Sun Chemical Corporation.

Red No. 104-(1): Red pigment "Sun CROMA D & C Red 28 Al Lake" (C.I. Acid Red 92) available from Sun Chemical Corporation.

Red No. 226: Red dye; "Red No. 226 K" (C.I. Vat Red 1) available from Kishi Kasei Co., Ltd.

TABLE 1

| | | | Production Examples | | | | |
|---|---|---|---|---|---|---|---|
| | | | 1-1 | 1-2 | 1-3 | 1-4 | 1-5 |
| No. of colorant water dispersion | | | 1 | 2 | 3 | 4 | 5 |
| Step I | Kind of colorant | | Yellow No. 5 | Yellow No. 4 | Blue No. 1 | Red No. 104-(1) | Red No. 226 |
| | Formulation of colorant mixture (g) | Colorant | 200 | 200 | 200 | 200 | 200 |
| | | Solution of anionic acrylic polymer (solid content: 40% by mass) | 200 | 200 | 200 | 200 | 200 |
| | | Ethanol | 170 | 170 | 170 | 170 | 170 |
| | | Ion-exchanged water | 412.9 | 412.9 | 412.9 | 412.9 | 412.9 |
| | | 5N NaOH aqueous solution | 17.1 | 17.1 | 17.1 | 17.1 | 17.1 |

TABLE 1-continued

|  |  | Production Examples | | | | |
|---|---|---|---|---|---|---|
|  |  | 1-1 | 1-2 | 1-3 | 1-4 | 1-5 |
|  | Mass ratio [colorant/water-dispersive polymer] in colorant mixture | 2.5 | 2.5 | 2.5 | 2.5 | 2.5 |
|  | Mass ratio [organic solvent/water] in colorant mixture | 0.68 | 0.68 | 0.68 | 0.68 | 0.68 |
|  | Conditions of dispersion treatment of colorant mixture | 180 MPa; 20 passes | | | | |
|  | Amount (g) of ion-exchanged water added after dispersion treatment | 900 | 900 | 900 | 900 | 900 |
|  | Solid content (% by mass) of colorant dispersion liquid | 14.7 | 14.7 | 14.7 | 14.7 | 14.7 |
|  | Volume-average particle size (nm) of colorant particles in colorant dispersion liquid | 160 | 173 | 129 | 112 | 156 |
| Step II | Mass ratio [organic solvent/water] in colorant dispersion liquid | 0.22 | 0.22 | 0.22 | 0.22 | 0.22 |
|  | Conditions for removal of organic solvent | 40° C.; 10 kPa; 2 hr + 62° C.; 7 kPa; 4 hr | | | | |
|  | Solid content (% by mass) of colorant water dispersion | 20.0 | 20.0 | 20.0 | 20.0 | 20.0 |
|  | Volume-average particle size (nm) of colorant particles in colorant water dispersion | 157 | 169 | 125 | 109 | 152 |

Production Example 1-6 (Production of Colorant (White Inorganic Pigment) Water Dispersion)

(Step I: Colorant Dispersing Step)

A 1,000 mL-capacity polypropylene bottle available from SANPLATEC Corporation was charged with 33.4 g of the solution of the cationic silicone polymer 1 obtained as the water-dispersive polymer in Synthesis Example 1 (solid content: 30% by mass), 200 g of a titanium oxide pigment "SI-Titan CR-50LHC" (surface-treated titanium oxide: treated with aluminum hydroxide and hydrogen dimethicone) as a white inorganic pigment available from Miyoshi Kasei Inc., 170 g of first-grade ethanol, and 1.6 g of citric acid. The contents of the bottle were shaken by hand to fully suspend the titanium oxide pigment in the solution of the cationic silicone polymer 1.

Then, 2,000 g of 1.2 mmϕ zirconia beads were added to the resulting suspension, and the obtained mixture was subjected to dispersion treatment using a bench top-type pot mill pedestal available from AS ONE Corporation at 250 rpm for 8 hours, followed by subjecting the resulting dispersion to filtration treatment through a metallic mesh filter to remove the zirconia beads from the dispersion.

Next, while stirring the obtained dispersion at a rotating speed of 1,400 rpm using a high-speed disperser "T.K. ROBOMIX" (equipped with "HOMODISPER 2.5 Model" (blade diameter: 40 mm) as a stirring device) available from Primix Corporation, 200 g of a solution of an anionic acrylic polymer "PLUS SIZE 9909B" (acid value: 50 mgKOH/g; unneutralized product; an ethanol solution having a solid content of 40% by mass) as a water-dispersive polymer available from GOO Chemical Co., Ltd., was added to the dispersion, followed by increasing the rotating speed up to 2,000 rpm at which the dispersion was stirred for 1 hour. Then, after the rotating speed was changed to 8,000 rpm at a jacket temperature of 15° C., 17.1 g of a 5N NaOH aqueous solution and 412.9 g of ion-exchanged water were added to the dispersion, and the resulting mixture was stirred for 3 hours, thereby obtaining a colorant mixture (concentration of ethanol in medium: 40.4% by mass; solid content: 28% by mass).

The thus obtained colorant mixture was subjected to dispersion treatment by passing the mixture through a Microfluidizer "Model: M-140K" available from Microfluidics Corporation under a pressure of 180 MPa 20 times, followed by adding 900 g of ion-exchanged water thereto, thereby obtaining a colorant dispersion liquid having a solid content of 14.7% by mass. The thus obtained colorant dispersion liquid was subjected to measurement for a volume-average particle size of colorant particles contained therein. The volume-average particle sizes of the colorant particles in the colorant dispersion liquid is shown in Table 2.

(Step II: Step of Removing Organic Solvent)

The same method as used for conducting the step II of each of Production Examples 1-1 to 1-5 was repeated to obtain a colorant water dispersion 6. The thus obtained colorant water dispersion 6 was subjected to measurement for a volume-average particle size of colorant particles contained therein. The volume-average particle size of the colorant particles in the colorant water dispersion 6 is shown in Table 2.

TABLE 2

|  |  |  | Production Example 1-6 |
|---|---|---|---|
|  | No. of colorant water dispersion | | 6 |
| Step |  | Kind of colorant | SI-Titan CR-50LHC |
| I | Formulation of colorant mixture (g) | Colorant | 200 |
|  |  | Solution of cationic silicone polymer 1 (solid content: 30% by mass) | 33.4 |
|  |  | Ethanol | 170 |
|  |  | Citric acid | 1.6 |

TABLE 2-continued

|  |  | Production Example 1-6 |
|---|---|---|
| | Solution of anionic acrylic polymer (solid content: 40% by mass) | 200 |
| | Ion-exchanged water | 412.9 |
| | 5N NaOH aqueous solution | 17.1 |
| | Mass ratio [colorant/water-dispersive polymer] in colorant mixture | 2.2 |
| | Mass ratio [organic solvent/water] in colorant mixture | 0.73 |
| | Conditions of dispersion treatment of colorant mixture | 180 MPa; 20 passes |
| | Amount (g) of ion-exchanged water added after dispersion treatment | 900 |
| | Solid content (% by mass) of colorant dispersion liquid | 14.7 |
| | Volume-average particle size (nm) of colorant particles in colorant dispersion liquid | 325 |
| Step II | Mass ratio [organic solvent/water] in colorant dispersion liquid | 0.22 |
| | Conditions for removal of organic solvent | 40° C.; 10 kPa; 2 hr + 62° C.; 7 kPa; 4 hr |
| | Solid content (%) of colorant water dispersion | 20.0 |
| | Volume-average particle size (nm) of colorant particles in colorant water dispersion | 319 |

(Preparation of Inks 1 and 2 Containing Inorganic Pigment)

According to the respective kinds and amounts shown in Table 3, the colorant water dispersion, polyethylene glycol 400 (hereinafter also referred to merely as "PEG400"), 1,2-hexanediol, 1,2-propanediol, a modified glycerin "Liponic EG-1" (ethyleneoxide 26 mol adduct of glycerin) available from Vantage Speciality Ingredients Inc., (hereinafter also referred to merely as "Liponic EG-1") and ion-exchanged water were added and mixed with each other, and the resulting mixed solution was subjected to filtration treatment through a 0.45 μm-mesh membrane filter "Minisart" available from Sartorius Inc., thereby obtaining inks 1 and 2. The static surface tension of each of the thus obtained inks 1 and 2 as measured at 20° C. was 36 mN/m, and the viscosity of the ink 1 as measured at 35° C. was 6.9 mPa·s, whereas the viscosity of the ink 2 as measured at 35° C. was 8.2 mPa·s.

TABLE 3

| | No. of ink | 1 | 2 |
|---|---|---|---|
| Formulation of ink (part(s) by mass) | Colorant water dispersion 1 (Yellow No. 5) | 7.2 | 0.0 |
| | Colorant water dispersion 2 (Yellow No. 4) | 0.0 | 6.4 |
| | Colorant water dispersion 3 (Blue No. 1) | 2.2 | 2.2 |
| | Colorant water dispersion 4 (Red No. 104-(1)) | 1.9 | 0.0 |
| | Colorant water dispersion 5 (Red No. 226) | 0.0 | 2.0 |
| | Colorant water dispersion 6 (White inorganic pigment) | 50.0 | 70.0 |
| | PEG400 | 4.0 | 4.0 |
| | 1,2-Hexanediol | 3.8 | 3.8 |
| | 1,2-Propanediol | 4.2 | 0.0 |
| | Liponic EG-1 | 4.0 | 4.0 |
| | Ion-exchanged water*[1] | Balance | Balance |

Note:
*[1]Balance in 100 parts by mass in total of ink

<Makeup Printing Using Cosmetic Handy Ink-Jet Printer>

Examples 1 to 18 and Comparative Examples 1 to 3

The respective components of the cosmetic handy ink-jet printer were replaced and changed over as described in Tables 4 and 5 to conduct makeup printing and evaluate various properties by the following methods.

The respective conditions as described in Tables 4 and 5 are as follows.

(1) Ink-Jet Head and Ink Receptacle
  Separate type: As shown in FIG. 3, the ink-jet head and the ink receptacle were disposed separately from each other.
  Integrated type: As shown in FIG. 6, the ink-jet head and the ink receptacle were disposed in the form of an integrated unit.
  In the printer of the separate type, the ink in the ink-jet head was circulated, whereas in the printer of the integrated type, the ink in the ink-jet head was not circulated. Incidentally, as the ink absorber provided in the ink receptacle, there was used a polyester-based urethane sponge "EVERLIGHT SK" available from Bridgestone Corporation.

(2) Disposition of Printer
  Vertical disposition: As shown in FIG. 1, by vertically disposing the vertically elongated printer in the dock, a conduit elongated in a vertical direction was provided, and the ink was circulated through the elongated conduit.
  Horizontal disposition: After vertically disposing the vertically elongated printer in the dock, the printer was laid down horizontally to intentionally reverse the relation between the conduit length L1 and the conduit length L2 to thereby conduct the procedure of circulation of the ink.

(3) Orientation of Head
  Horizontal orientation: As shown in FIG. 3 and FIG. 5, printing was conducted with the nozzles being oriented laterally relative to the vertical direction (i.e., in the horizontal direction). In Example 15 in which the printer was also disposed laterally, similarly to the other Examples, printing was conducted with the nozzles being oriented laterally relative to the vertical direction (i.e., in the horizontal direction).

(4) Conduit Length L1 and Conduit Length L2, and Ratio of [L1/L2]
  The conduit length L1 and the conduit length L2, and the ratio of [L1/L2] were varied as shown in Tables 4 and 5. When the ratio of [L1/L2] is more than 1, the flow path as a whole was vertically elongated. Therefore, it is considered that the circulation of the ink through such a flow path effectively acts to prevent precipitation of the inorganic pigment.

(5) Body Deelectrification Device

The case in which the multi-layer ceramic chip capacitor (body deelectrification device) capable of releasing electrification charges when the cordless hand-held unit was electrified was mounted to the hand-held unit, was indicated by the term "mounted" in the following tables. As the multi-layer ceramic chip capacitor, there was used a multi-layer ceramic chip capacitor (catalogue product number: CGA3EAC0G2A103J080AC) available from TDK Corporation.

(6) Circulation Time Before Printing

The circulation time before printing represents a time interval in which no printing was conducted, or a time period in which the pump was operated before printing to circulate the ink through the ink flow path.

(7) 5 μm Flow Path Filter

The case in which a cellulose acetate membrane filter having a filter pore size of 5 μm available from Sartorius Inc., was used at the positions at which the filters 201 and 203 were located as shown in FIG. 11, or filters 401 and 403 were located as shown in FIG. 12, was indicated by the term "Yes" in the following tables.

(8) Connection of Flow Paths to Earth Upon Circulation

The connecting portions formed of a conductive material as the conductive conduits 111 shown in FIG. 3 and the conductive conduits 314 shown in FIG. 6 were coupled to the flow path conduits, and electrically connected to the grounded circuit 112 shown in FIG. 3 and the grounded circuit 315 shown in FIG. 6, respectively. In FIG. 3 and FIG. 6, all of the actual connecting portions are not shown. When circulating the ink, the ink was allowed to impinge against the conductive material at the corners of the flow paths where a turbulent flow of the ink tends to be caused, and electrification charges produced by the friction between the circulated ink and the conduit were transferred to the conductive material of the respective conductive conduits 111 and 314. Then, the electrical charges were transferred from the conductive material to the grounded circuits 112 and 315, respectively, so that it was possible to eliminate the electrification charges present in the flow paths.

(9) Use of Substrate Deelectrification Device

The case in which as shown in FIG. 13, the substrate deelectrification device 5a was equipped with the conductive roller 501 formed of the conductive material and the deelectrification section 502 constructed of the multi-layer ceramic chip capacitor, and the mechanism of transferring electrical charges on a surface layer of the substrate 507 to the deelectrification section 502 via the conductive roller 501 was incorporated in the substrate deelectrification device, was indicated by the term "Yes" in the following tables. As the multi-layer ceramic chip capacitor, there was used the aforementioned multi-layer ceramic chip capacitor available from TDK Corporation.

(10) Use of Water Mist Spraying

The case in which as shown in FIG. 14, electrified water fine particles were generated using the substrate deelectrification device 5b, was indicated by the term "Yes" in the following tables. As the multi-layer ceramic chip capacitor, there was used the aforementioned multi-layer ceramic chip capacitor available from TDK Corporation. As the unit for generation of electrified water fine particles as the substrate deelectrification device 5b constructed of the Peltier element 601, the terminal electrode 602, the grounded circuit 605 and the heat radiator plate 610, there was used the "nanoe"- unit dismounted from a humidifier air purifier "F-UXS90" available from Panasonic Corporation.

(11) Use of Tail-Side Roller

The case in which as the mist recovery device 11a shown in FIG. 9, the roller 503 disposed on a tail end side of the printer as viewed in the printer scanning direction was replaced with any of the following three kinds of rollers, and negatively charged for recovery of the ink mist, was indicated by the term "Yes" in the following tables, whereas the case in which the roller 503 was not electrified was indicated by the term "No" in the following tables.

When electrifying the roller 503, a nylon brush roller available from Kyoshin Giken Co., Ltd., was further used as the roller 504. After allowing the roller 504 to come into frictional contact with the electrified roller 503, positive charges generated on the surface of the roller 504 were removed using a metal wire, and the thus removed positive charges were fed through a copper wire and stored in the capacitor 505. When connecting the hand-held unit to the dock unit, the electrical charges stored in the capacitor 505 were connected to earth through the grounded circuit, though not shown in the figures. Incidentally, as the capacitor 505, there was used the aforementioned multi-layer ceramic chip capacitor available from TDK Corporation.

In the case where the roller 503 was not electrified, no roller 504 was mounted to the printer.

[Kinds of Rollers]

Roller A: PTFE star-shaped wheel that was likely to be negatively charged;

Roller B: PTFE cylindrical roller that was likely to be negatively charged; and

Roller C: Metallic cylindrical roller that was hardly negatively charged (diameter: 2.4 mm; length: 25.4 mm).

The PTFE star-shaped wheel used as the roller A was manufactured by covering a metallic star-shaped wheel having a diameter of 1.2 mm and a length of 25.4 mm with a PTFE heat-shrinkable tube (product number: TKF-100-2) available from Chukoh Chemical Industries, Ltd., and then subjecting the thus covered wheel to heating and contracting in an electric furnace heated to 330° C. to thereby obtain the roller A using the metallic star-shaped wheel as a core bar.

In addition, the PTFE cylindrical roller used as the roller B was manufactured by covering a metallic cylindrical roller having a diameter of 1.2 mm and a length of 25.4 mm with a PTFE heat-shrinkable tube (product number: TKF-100-2) available from Chukoh Chemical Industries, Ltd., and then subjecting the thus covered roller to heating and contracting in an electric furnace heated to 330° C. to thereby obtain the roller B using the metallic cylindrical roller as a core bar.

(12) Use of Electrification Mesh

In the mist recovery device 11b shown in FIG. 10, the conductive mesh 903 was negatively charged, and the positively charged mist was adsorbed thereonto. As the metallic mesh, there was used a stainless steel metallic mesh No. 100 (wire diameter: 0.1 mm; opening size: 0.154 mm; porosity: 36.5%), and the metallic mesh was arranged such that the ink as main droplets ejected from the nozzles of the ink-jet head were allowed to pass though opening portions of the mesh. The case in which the mesh was disposed in front of the nozzles of the head, and negatively charged, was indicated by the term "Yes" in the following tables.

[Evaluation 1: Evaluation of Initial Ejection Properties]

A 45 years old male (one person) was selected as a subject. The upper arm of a left hand of the subject was washed using a generally commercially available facial cleaner, and then water droplets remained attached thereonto were removed by wiping off them with a towel. Next, the respective inks shown in Table 3 were filled in the cosmetic handy ink-jet printer. Then, with the device construction as shown in Tables 4 and 5, immediately after the elapse of the predetermined circulation time of the ink as shown in Tables 4 and 5, a nozzle check pattern having a width of 25.4 mm and a length of 50.8 mm was printed on the upper arm of the left hand of the subject using all of the nozzles to evaluate ejection properties of the ink and occurrence or non-occurrence of the ink mist. Since the blue color of the colorant water dispersion 3 contained in each of the ink 1 and the ink 2 had a relation of a complementary color to the skin color, the condition of deposition of the ink droplets on the skin was easily recognizable, so that it was possible to confirm the condition of ejection of the ink from the nozzles and the condition of occurrence of the ink mist.

[Evaluation of Ejection of Ink]

Among 640 nozzles as the whole nozzles provided in the head, the number of the nozzles that were capable of normally ejecting the ink was counted, and the ratio of the number of the nozzles that were capable of normally ejecting the ink to the total number of the nozzles, i.e., 640, are shown in Tables 4 and 5. In addition, when printing the nozzle check pattern, the obtained print was observed to examine whether or not any trace of the ink mist adhered to a region of the print other than the check pattern printed region was present. The results are shown in Tables 4 and 5.

The larger the ratio of the number of the nozzles that were capable of normally ejecting the ink to the total number of the nozzles becomes, the more excellent the ejection properties of the ink is. When the ratio of the number of the nozzles that were capable of normally ejecting the ink to the total number of the nozzles is not less than 90%, it is possible to obtain a high-quality makeup image, and when the ratio of the number of the nozzles that were capable of normally ejecting the ink is not less than 85%, the ink is practically usable without problems. However, when the ratio of the number of the nozzles that were capable of normally ejecting the ink is less than 85%, unevenness of ejection of the ink tends to be noticeable, and further when the ratio of the number of the nozzles that were capable of normally ejecting the ink is not more than 80%, the printer is practically unusable owing to remarkable unevenness of ejection of the ink.

[Occurrence or Non-Occurrence of Ink Mist]

The occurrence or non-occurrence of the ink mist was ascertained by observing an inside portion of the check pattern printed and its surrounding portions with a margin width of 10 mm using a digital microscope "Dino-Lite Edge S 3.0 EDR/EDOF/AMR/FLC Polarizer" available from THANKO CO., LTD. When the ink mist was generated, dots having a size smaller than that of dots forming the nozzle check pattern were irregularly present in gaps in the nozzle check pattern or the surrounding portions thereof.

It is most preferred that no ink mist is generated. However, even though the ink mist is generated, if the ink mist is applied only to the gaps in the nozzle check pattern, it is considered that the ink mist can be well recovered and applied to the skin by the printer, and therefore in such a case, the printer is practically usable without problems. On the other hand, if occurrence of the ink mist is also observed even in the surrounding portions of the nozzle check pattern, it is considered that the ink mist thus applied to the surrounding portions is owing to the mist undesirably floated out of the region to be printed. Therefore, in such a case, it is considered that the printer is practically unusable.

[Evaluation 2: Evaluation of Continuous Ejection Properties]

A 45 years old male (one person) was selected as a subject. The upper arm of a left hand of the subject was washed using a generally commercially available facial cleaner, and then water droplets remained attached thereonto were removed by wiping off them with a towel. Next, the respective inks shown in Tables 4 and 5 were filled in the cosmetic handy ink-jet printer. Then, with the device construction as shown in Tables 4 and 5, immediately after the elapse of the circulation time of the ink as shown in Tables 4 and 5, a 100%-solid image pattern having a width of 25.4 mm and a length of 200 mm was printed on the upper arm of the left hand of the subject using all of the nozzles, and the printing operation was conducted 5 times. Then, a nozzle check pattern having a width of 25.4 mm and a length of 50.8 mm was printed using all of the nozzles to evaluate ejection properties of the ink and occurrence or non-occurrence of the ink mist by the same method as used in the aforementioned evaluation 1 for initial ejection properties of the ink. The results are shown in Tables 4 and 5.

[Evaluation 3: Evaluation of Occurrence of Ink Mist Upon Continuous Ejection]

Using the mist detection device shown in FIG. 16, a reduced amount of light owing to adhesion of the ink mist thereto was measured. With the assumption that the amount of light that was emitted from a light source and reflected on a quartz cell, and then entered into a phototransistor in the case where no ink mist was adhered to the quartz cell was 100%, the degree of reduction in the amount of light entering to the phototransistor owing to the adhesion of the ink mist was measured.

The printing test was conducted by selecting a 45 years old male (one person) as a subject. The upper arm of a left hand of the subject was washed using a generally commercially available facial cleaner, and then water droplets remained attached thereonto were removed by wiping off them with a towel. Next, the respective inks shown in Table 3 were filled in the cosmetic handy ink-jet printer. Then, with the device construction as shown in Tables 4 and 5, immediately after the elapse of the circulation time of the ink as shown in Tables 4 and 5, a 100%-solid image pattern having a width of 25.4 mm and a length of 200 mm was printed on the upper arm of the left hand of the subject using all of the nozzles, and the printing operation was conducted 20 times. During the printing test, the amount of light was always measured by the mist detection device, and the solid image pattern printing was conducted 20 times to count the number of the pattern printing operations in which the amount of the light entering into the phototransistor was reduced to less than 99%, and the thus counted numbers of the pattern printing operations in the respective Examples and Comparative Examples are shown in Tables 4 and 5. In the case where there was present no printing operation in which the amount of the light entering into the phototransistor was reduced to less than 99% even when conducting the pattern printing operation 20 times, the number of the pattern printing operations was indicated by 20 in Tables 4 and 5. In addition, the amounts of the light entering into the phototransistor upon termination of the printing operation are shown in Tables 4 and 5. The amounts of the light entering into the phototransistor showed monotonic decreasing, and once the ink mist was adhered to the quartz cell, no desorption of the ink mist therefrom was observed.

In the case where the amount of the light entering into the phototransistor upon termination of the printing operation was not less than 99%, no ink mist that was floated around and adhered to the quartz cell was generated. In this case, it was considered that since occurrence of the ink mist could be well suppressed, such a condition was most preferred, and therefore the present apparatus could be suitably applied to a facial surface, etc., having a risk of aspiration of the ink mist.

In the case where the amount of the light entering into the phototransistor upon termination of the printing operation was not less than 95% and less than 99%, the risk of aspiration of the ink mist was not completely eliminated. Therefore, in such a case, it was necessary to mount the hand-held unit back to the dock unit as a body member each time at which the amount of the light entering into the phototransistor as measured by the mist detection device was reduced to less than 99%, to conduct a maintenance work thereof.

In the case where the amount of the light entering into the phototransistor upon termination of the printing operation was not less than 90% and less than 95%, it was difficult to apply the present apparatus to a human face having a risk of aspiration of the ink mist. However, in such a case, the present apparatus was still suitably applicable to a human body portion remote from a nose or a mouth, such as a nape of the neck, a neck, an arm, etc., having a less risk of aspiration of the ink mist.

In the case where the amount of the light entering into the phototransistor upon termination of the printing operation was less than 90%, the ink mist was also adhered to an exterior of the apparatus or hands, so that problems concerning not only safety, but also contamination of surrounding portions, were caused. Therefore, in such a case, it was considered that the practical use of the printer was undesirable.

[Evaluation 4: Evaluation of Ejection Properties of Ink after Allowing Apparatus to Stand]

A 45 years old male (one person) was selected as a subject. The upper arm of a left hand of the subject was washed using a generally commercially available facial cleaner, and then water droplets remained attached thereonto were removed by wiping off them with a towel. Next, the respective inks shown in Table 3 were filled in the cosmetic handy ink-jet printer. Then, with the device construction as shown in Tables 4 and 5, after the elapse of the circulation time of the ink as shown in Tables 4 and 5, the hand-held unit was dismounted from the dock unit, and allowed to stand for 5 minutes with a nozzle face of the head being directed upward.

Then, immediately after the standing, a nozzle check pattern having a width of 25.4 mm and a length of 50.8 mm was printed on the upper arm of the left hand of the subject using all of the nozzles to evaluate ejection properties of the ink and occurrence or non-occurrence of the ink mist by the same method as used in the aforementioned evaluation 1 for initial ejection properties of the ink. The results are shown in Tables 4 and 5.

[Evaluation 5: Evaluation of Ejection Properties of Ink after Allowing Apparatus to Stand and then Conducting Circulation Operation]

A 45 years old male (one person) was selected as a subject. The upper arm of a left hand of the subject was washed using a generally commercially available facial cleaner, and then water droplets remained attached thereonto were removed by wiping off them with a towel. Next, the respective inks shown in Table 3 were filled in the cosmetic handy ink-jet printer. Then, with the device construction as shown in Tables 4 and 5, after the elapse of the circulation time of the ink as shown in Tables 4 and 5, the hand-held unit was dismounted from the dock unit, and allowed to stand for 5 minutes with a nozzle face of the head being directed upward.

Then, the hand-held unit was mounted back to the dock unit, and the circulation operation of the ink through the printer was carried out for 5 minutes.

Then, immediately after the circulation operation, a nozzle check pattern having a width of 25.4 mm and a length of 50.8 mm was printed on the upper arm of the left hand of the subject using all of the nozzles to evaluate ejection properties of the ink and occurrence or non-occurrence of the ink mist by the same method as used in the aforementioned evaluation for initial ejection properties of the ink. The results are shown in Tables 4 and 5.

TABLE 4

| | | Examples | | | | |
|---|---|---|---|---|---|---|
| | | 1 | 2 | 3 | 4 | 5 |
| Kind of ink | | Ink 1 | Ink 1 | Ink 1 | Ink 1 | Ink 1 |
| Components of cosmetic handy ink-jet printer | Ink-jet head and ink receptacle | Separate-type | Separate-type | Separate-type | Separate-type | Separate-type |
| | Installation of printer | Vertical disposition | Vertical disposition | Vertical disposition | Vertical disposition | Vertical disposition |
| | Orientation of head | Horizontally oriented | Horizontally oriented | Horizontally oriented | Horizontally oriented | Horizontally oriented |
| | L1 | 16 | 16 | 16 | 16 | 16 |
| | L2 | 4 | 4 | 4 | 4 | 4 |
| | Ratio [L1/L2] | 4 | 4 | 4 | 4 | 4 |
| | Body deelectrification device | Mounted | Mounted | Mounted | Mounted | Mounted |
| | Circulation time before printing | 1 min | 1 min | 1 min | 1 min | 1 min |
| | 5 μm Flow path filter | Yes | No | Yes | No | Yes |
| | Connection of flow path to earth upon circulation | Yes | No | No | Yes | Yes |
| | Use of substrate deelectrification device | Yes | No | No | No | No |

TABLE 4-continued

|  |  |  |  |  |  |  |  |
|---|---|---|---|---|---|---|---|
|  |  | Use of water mist spraying |  | Yes | No | No | No | No |
|  |  | Use of tail-side roller | Kind of roller | A | C | C | C | C |
|  |  |  | Electrified or not | Yes | No | No | No | No |
|  |  | Use of electrification mesh |  | Yes | No | No | No | No |
| Evaluation 1 (Initial ejection properties) | Number of nozzles |  | 640 | 610 | 615 | 615 | 620 |
|  | Ratio of number of nozzles |  | 100% | 95% | 96% | 96% | 97% |
|  | Occurrence or non-occurrence of ink mist | Inside of pattern | No | No | No | No | No |
|  |  | Around pattern | No | No | No | No | No |
| Evaluation 2 (Continuous ejection properties) | Number of nozzles |  | 630 | 590 | 600 | 600 | 610 |
|  | Ratio of number of nozzles |  | 98% | 92% | 94% | 94% | 95% |
|  | Occurrence or non-occurrence of ink mist | Inside of pattern | No | No | No | No | No |
|  |  | Around pattern | No | No | No | No | No |
| Evaluation 3 | Number of printing operations*[1] |  | 20 | 13 | 19 | 19 | 20 |
|  | Amount of light entering upon termination of printing |  | 99% | 97% | 98% | 98% | 99% |
| Evaluation 4 (Ejection properties after allowing apparatus to stand) | Number of nozzles |  | 610 | 570 | 580 | 580 | 590 |
|  | Ratio of number of nozzles |  | 95% | 89% | 91% | 91% | 92% |
|  | Occurrence or non-occurrence of ink mist | Inside of pattern | No | Yes | No | No | No |
|  |  | Around pattern | No | No | No | No | No |
| Evaluation 5 (Ejection properties after allowing apparatus to stand and then conducting circulation operation) | Number of nozzles |  | 640 | 590 | 605 | 605 | 620 |
|  | Ratio of number of nozzles |  | 100% | 92% | 95% | 95% | 97% |
|  | Occurrence or non-occurrence of ink mist | Inside of pattern | No | No | No | No | No |
|  |  | Around pattern | No | No | No | No | No |

|  |  |  | Examples | | | | |
|---|---|---|---|---|---|---|---|
|  |  |  | 6 | 7 | 8 | 9 | 10 |
| Kind of ink |  |  | Ink 1 | Ink 1 | Ink 1 | Ink 1 | Ink 1 |
| Components of cosmetic handy ink-jet printer | Ink-jet head and ink receptacle |  | Separate-type | Separate-type | Separate-type | Separate-type | Separate-type |
|  | Installation of printer |  | Vertical disposition | Vertical disposition | Vertical disposition | Vertical disposition | Vertical disposition |
|  | Orientation of head |  | Horizontally oriented | Horizontally oriented | Horizontally oriented | Horizontally oriented | Horizontally oriented |
|  | L1 |  | 16 | 16 | 16 | 16 | 16 |
|  | L2 |  | 4 | 4 | 4 | 4 | 4 |
|  | Ratio [L1/L2] |  | 4 | 4 | 4 | 4 | 4 |
|  | Body deelectrification device |  | Mounted | Mounted | Mounted | Mounted | Mounted |
|  | Circulation time before printing |  | 1 min | 1 min | 1 min | 1 min | 1 min |
|  | 5 μm Flow path filter |  | No | No | No | No | No |
|  | Connection of flow path to earth upon circulation |  | No | No | No | No | No |
|  | Use of substrate deelectrification device |  | Yes | No | No | No | No |
|  | Use of water mist spraying |  | No | Yes | No | No | No |
|  | Use of tail-side roller | Kind of roller | C | C | B | A | C |
|  |  | Electrified or not | No | No | Yes | Yes | No |
|  | Use of electrification mesh |  | No | No | No | No | Yes |
| Evaluation 1 (Initial ejection properties) | Number of nozzles |  | 615 | 615 | 615 | 615 | 615 |
|  | Ratio of number of nozzles |  | 96% | 96% | 96% | 96% | 96% |
|  | Occurrence or non-occurrence of ink mist | Inside of pattern | No | No | No | No | No |
|  |  | Around pattern | No | No | No | No | No |

TABLE 4-continued

| | | | | | | | |
|---|---|---|---|---|---|---|---|
| Evaluation 2 (Continuous ejection properties) | Number of nozzles | | 595 | 595 | 595 | 595 | 595 |
| | Ratio of number of nozzles | | 93% | 93% | 90% | 93% | 93% |
| | Occurrence or non-occurrence of ink mist | Inside of pattern | No | No | No | No | No |
| | | Around pattern | No | No | No | No | No |
| Evaluation 3 | Number of printing operations*[1] | | 16 | 16 | 15 | 15 | 16 |
| | Amount of light entering upon termination of printing | | 97% | 97% | 95% | 95% | 96% |
| Evaluation 4 (Ejection properties after allowing apparatus to stand) | Number of nozzles | | 575 | 575 | 575 | 575 | 575 |
| | Ratio of number of nozzles | | 90% | 90% | 90% | 90% | 90% |
| | Occurrence or non-occurrence of ink mist | Inside of pattern | No | No | No | No | No |
| | | Around pattern | No | No | No | No | No |
| Evaluation 5 (Ejection properties after allowing apparatus to stand and then conducting circulation operation) | Number of nozzles | | 595 | 595 | 595 | 595 | 595 |
| | Ratio of number of nozzles | | 93% | 93% | 91% | 93% | 93% |
| | Occurrence or non-occurrence of ink mist | Inside of pattern | No | No | No | No | No |
| | | Around pattern | No | No | No | No | No |

Note:
*[1] The number of printing operations at which an amount of light entering into a phototransistor was reduced to less than 99%.

TABLE 5

| | | | Examples | | | | | |
|---|---|---|---|---|---|---|---|---|
| | | | 11 | 12 | 13 | 14 | 15 | 16 |
| Kind of ink | | | Ink 1 | Ink 1 | Ink 1 | Ink 1 | Ink 1 | Ink 1 |
| Components of cosmetic handy ink-jet printer | Ink-jet head and ink receptacle | | Separate-type | Separate-type | Separate-type | Separate-type | Separate-type | Integrated-type |
| | Installation of printer | | Vertical disposition | Vertical disposition | Vertical disposition | Vertical disposition | Horizontal disposition | Vertical disposition |
| | Orientation of head | | Horizontally oriented | Horizontally oriented | Horizontally oriented | Horizontally oriented | Horizontally oriented | Horizontally oriented |
| | L1 | | 16 | 12 | 9 | 6 | 6 | 16 |
| | L2 | | 4 | 6 | 9 | 12 | 12 | 4 |
| | Ratio [L1/L2] | | 4 | 2 | 1 | 0.5 | 0.5 | 4 |
| | Body deelectrification device | | Mounted | Mounted | Mounted | Mounted | Mounted | Mounted |
| | Circulation time before printing | | 1 min | 1 min | 1 min | 1 min | 1 min | 1 min |
| | 5 µm Flow path filter | | No | Yes | Yes | Yes | Yes | Yes |
| | Connection of flow path to earth upon circulation | | No | Yes | Yes | Yes | Yes | Yes |
| | Use of substrate deelectrification device | | Yes | Yes | Yes | Yes | Yes | Yes |
| | Use of water mist spraying | | Yes | Yes | Yes | Yes | Yes | Yes |
| | Use of tail-side roller | Kind of roller | A | A | A | A | A | A |
| | | Electrified or not | Yes | Yes | Yes | Yes | Yes | Yes |
| | Use of electrification mesh | | Yes | Yes | Yes | Yes | Yes | Yes |
| Evaluation 1 (Initial ejection properties) | Number of nozzles | | 630 | 630 | 620 | 600 | 590 | 630 |
| | Ratio of number of nozzles | | 98% | 98% | 97% | 94% | 92% | 98% |
| | Occurrence or non-occurrence of ink mist | Inside of pattern | No | No | No | No | No | No |
| | | Around pattern | No | No | No | No | No | No |
| Evaluation 2 (Continuous ejection properties) | Number of nozzles | | 610 | 610 | 600 | 580 | 560 | 610 |
| | Ratio of number of nozzles | | 95% | 95% | 94% | 91% | 88% | 95% |
| | Occurrence or non-occurrence of ink mist | Inside of pattern | No | No | No | No | Yes | No |
| | | Around pattern | No | No | No | No | No | No |
| Evaluation 3 | Number of printing operations*[1] | | 20 | 20 | 19 | 12 | 10 | 20 |
| | Amount of light entering upon termination of printing | | 99% | 99% | 98% | 93% | 92% | 99% |

TABLE 5-continued

| | | | | | | | |
|---|---|---|---|---|---|---|---|
| Evaluation 4 (Ejection properties after allowing apparatus to stand) | Number of nozzles | | 590 | 580 | 570 | 550 | 520 | 570 |
| | Ratio of number of nozzles | | 92% | 91% | 89% | 86% | 81% | 89% |
| | Occurrence or non-occurrence of ink mist | Inside of pattern | No | No | Yes | Yes | Yes | Yes |
| | | Around pattern | No | No | No | No | No | No |
| Evaluation 5 (Ejection properties after allowing apparatus to stand and then conducting circulation operation) | Number of nozzles | | 610 | 600 | 590 | 570 | 550 | 590 |
| | Ratio of number of nozzles | | 95% | 94% | 92% | 89% | 86% | 92% |
| | Occurrence or non-occurrence of ink mist | Inside of pattern | No | No | No | Yes | Yes | No |
| | | Around pattern | No | No | No | No | No | No |

| | | | Examples | | Comparative Examples | | |
|---|---|---|---|---|---|---|---|
| | | | 17 | 18 | 1 | 2 | 3 |
| Components of cosmetic handy ink-jet printer | Kind of ink | | Ink 2 | Ink 2 | Ink 1 | Ink 1 | Ink 1 |
| | Ink-jet head and ink receptacle | | Separate-type | Integrated-type | Separate-type | Separate-type | Separate-type |
| | Installation of printer | | Vertical disposition | Vertical disposition | Vertical disposition | Vertical disposition | Vertical disposition |
| | Orientation of head | | Horizontally oriented | Horizontally oriented | Horizontally oriented | Horizontally oriented | Horizontally oriented |
| | L1 | | 16 | 16 | 16 | 6 | 12 |
| | L2 | | 4 | 4 | 4 | 12 | 6 |
| | Ratio [L1/L2] | | 4 | 4 | 4 | 0.5 | 2 |
| | Body deelectrification device | | Mounted | Mounted | Not mounted | Not mounted | Not mounted |
| | Circulation time before printing | | 1 min | 1 min | Not circulated | 1 min | 1 min |
| | 5 μm Flow path filter | | Yes | Yes | No | No | No |
| | Connection of flow path to earth upon circulation | | Yes | Yes | No | No | No |
| | Use of substrate deelectrification device | | Yes | Yes | No | No | No |
| | Use of water mist spraying | | Yes | Yes | No | No | No |
| | Use of tail-side roller | Kind of roller | A | A | C | C | C |
| | | Electrified or not | Yes | Yes | No | No | No |
| | Use of electrification mesh | | Yes | Yes | No | No | No |
| Evaluation 1 (Initial ejection properties) | Number of nozzles | | 620 | 610 | 520 | 520 | 550 |
| | Ratio of number of nozzles | | 97% | 95% | 81% | 81% | 86% |
| | Occurrence or non-occurrence of ink mist | Inside of pattern | No | No | Yes | Yes | Yes |
| | | Around pattern | No | No | Yes | Yes | Yes |
| Evaluation 2 (Continuous ejection properties) | Number of nozzles | | 610 | 590 | 460 | 470 | 500 |
| | Ratio of number of nozzles | | 95% | 92% | 72% | 73% | 78% |
| | Occurrence or non-occurrence of ink mist | Inside of pattern | No | No | Yes | Yes | Yes |
| | | Around pattern | No | No | Yes | Yes | Yes |
| Evaluation 3 | Number of printing operations*[1] | | 20 | 13 | 1 | 1 | 1 |
| | Amount of light entering upon termination of printing | | 99% | 93% | 71% | 72% | 74% |
| Evaluation 4 (Ejection properties after allowing apparatus to stand) | Number of nozzles | | 570 | 530 | 430 | 440 | 470 |
| | Ratio of number of nozzles | | 89% | 83% | 67% | 69% | 73% |
| | Occurrence or non-occurrence of ink mist | Inside of pattern | Yes | Yes | Yes | Yes | Yes |
| | | Around pattern | No | No | Yes | Yes | Yes |
| Evaluation 5 (Ejection properties after allowing apparatus to stand and then conducting circulation operation) | Number of nozzles | | 590 | 550 | 440 | 450 | 470 |
| | Ratio of number of nozzles | | 92% | 86% | 69% | 70% | 73% |
| | Occurrence or non-occurrence of ink mist | Inside of pattern | No | Yes | Yes | Yes | Yes |
| | | Around pattern | No | No | Yes | Yes | Yes |

Note:
*[1]The number of printing operations at which an amount of light entering into a phototransistor was reduced to less than 99%.

From Tables 4 and 5, it was confirmed that the cosmetic handy ink-jet printers of Examples 1 to 18 were capable of suppressing occurrence of the ink mist, and further were excellent in initial ejection properties, continuous ejection properties, ejection properties after allowing the cosmetic handy ink-jet printers to stand, and ejection properties after allowing the apparatuses to stand and after conducting circulation operation of the ink therethrough, as compared to the cosmetic handy ink-jet printers of Comparative Examples 1 to 3.

INDUSTRIAL APPLICABILITY

The cosmetic handy ink-jet printer of the present invention is excellent in ejection properties of an ink and capable of reducing ink mist by-produced in association with the action of ejection of the ink even when the ink contains an inorganic pigment as a colorant, and therefore can be suitably used, for example, in a makeup method in which makeup is applied by printing to a substrate to be printed, such as a skin, a hair, a nail, etc., by ejecting the ink containing the inorganic pigment from an ink-jet head to the substrate, such as a skin, a hair, a nail, etc.

REFERENCE SIGNS LIST

1: Cosmetic handy ink-jet printer
2: Dock unit
3: Hand-held unit
10: Ink circulation device
11: Mist recovery device
12: Mist detection device
20: CPU
21: Charging device
22: Maintenance device
23: Transmitting and receiving section
24: Image processing circuit
25: Grounded circuit (body deelectrification device)
26: Dock-side conductive terminal
27: Earth
30: Head control section
31: Optical position sensor
32: Roller encoder
33: Hand-held-side conductive terminal
34: Ink circulation path
35: Grip portion
100: Ink receptacle
101: Ink-jet head
505: Capacitor (body deelectrification device)

The invention claimed is:

1. A cosmetic handy ink-jet printer, comprising:
an ink-jet head for ejecting an ink comprising an inorganic pigment;
an ink circulation device for circulating the ink; and
a body deelectrification device for removing static electricity from a body of the printer,
wherein:
the ink circulation device comprises an ink receptacle in which the ink is accommodated, and an ink circulation path through which the ink is circulated,
the body deelectrification device is a capacitor or a grounded circuit, and
a flow direction of a circulation mechanism provided by the ink circulation device is a direction that is resistant against gravity over not less than 25% of a whole length of the circulation path.

2. The cosmetic handy ink-jet printer according to claim 1, further comprising a mist recovery device for recovering mist by-produced in association with an action of ejection of the ink from the ink-jet head.

3. The cosmetic handy ink-jet printer according to claim 2, wherein the mist recovery device is a negatively charged roller.

4. The cosmetic handy ink-jet printer according to claim 3, wherein the roller is of a star wheel shape.

5. The cosmetic handy ink-jet printer according to claim 2, wherein the mist recovery device is a negatively charged conductive mesh.

6. The cosmetic handy ink-jet printer according to claim 1, wherein the ink circulation device comprises a trap for capturing at least one material selected from the group consisting of inorganic pigment coarse particles and air bubbles therein.

7. The cosmetic handy ink-jet printer according to claim 6, wherein the trap is a filter disposed in the ink circulation path.

8. The cosmetic handy ink-jet printer according to claim 6, wherein the trap is a surplus space provided in the ink circulation path.

9. The cosmetic handy ink-jet printer according to claim 1, further comprising a substrate deelectrification device for deelectrifying a substrate to be printed before printing.

10. The cosmetic handy ink-jet printer according to claim 9, wherein the substrate deelectrification device comprises a conductive roller having electrical conductivity and a deelectrification section connected to the conductive roller.

11. The cosmetic handy ink-jet printer according to claim 9, wherein the substrate deelectrification device serves for applying negatively charged water fine particles to the substrate to be printed before printing.

12. The cosmetic handy ink-jet printer according to claim 1, further comprising a mist detection device for detecting the mist by-produced in association with the action of ejection of the ink from the ink-jet head.

13. The cosmetic handy ink-jet printer according to claim 1, wherein the ink circulation device comprises a conductive conduit for removing static electricity generated in the ink circulated, and a grounded circuit connected to the conductive conduit for escaping electrical charges therethrough.

14. The cosmetic handy ink-jet printer according to claim 1, comprising a dock unit, and a hand-held unit that is detachable from the dock unit to conduct makeup printing.

15. The cosmetic handy ink-jet printer according to claim 14, wherein the hand-held unit comprises the ink-jet head and the ink circulation device.

16. The cosmetic handy ink-jet printer according to claim 14, wherein the hand-held unit comprises the capacitor as the body deelectrification device.

17. The cosmetic handy ink-jet printer according to claim 14, wherein the dock unit comprises the grounded circuit as the body deelectrification device.

18. The cosmetic handy ink-jet printer according to claim 14, wherein the hand-held unit further comprises a deelectrification device for removing static electricity separately from the body deelectrification device.

19. A method of makeup printing with the cosmetic handy ink-jet printer of claim 1, comprising:
ejecting the ink comprising the inorganic pigment from the ink-jet head to a substrate to be printed which is a skin, a hair, or a nail.

* * * * *